(12) United States Patent
Katzin et al.

(10) Patent No.: US 9,846,905 B2
(45) Date of Patent: *Dec. 19, 2017

(54) GATEWAY ABSTRACTION LAYER

(71) Applicant: Visa International Service Association, San Francisco, CA (US)

(72) Inventors: Edward Katzin, San Francisco, CA (US); Mark Carlson, Half Moon Bay, CA (US)

(73) Assignee: Visa International Service Association, San Francisco, CA (US)

(*) Notice: Subject to any disclaimer, the term of this patent is extended or adjusted under 35 U.S.C. 154(b) by 144 days.

This patent is subject to a terminal disclaimer.

(21) Appl. No.: 13/971,250

(22) Filed: Aug. 20, 2013

(65) Prior Publication Data

US 2013/0339250 A1 Dec. 19, 2013

Related U.S. Application Data

(63) Continuation of application No. 13/180,391, filed on Jul. 11, 2011, now Pat. No. 8,543,508.

(Continued)

(51) Int. Cl.
*G06Q 40/00* (2012.01)
*G06Q 20/02* (2012.01)
(Continued)

(52) U.S. Cl.
CPC ........... *G06Q 40/00* (2013.01); *G06Q 20/027* (2013.01); *G06Q 20/0855* (2013.01); *G06Q 20/10* (2013.01); *G06Q 20/40* (2013.01)

(58) Field of Classification Search
CPC .. G06Q 20/027; G06Q 20/0855; G06Q 40/00; G06Q 20/40; G06Q 20/10; G06C 20/0855
(Continued)

(56) References Cited

U.S. PATENT DOCUMENTS 5,341,477 A 8/1994 Pitkin et al.
5,453,601 A 9/1995 Rosen
(Continued)

FOREIGN PATENT DOCUMENTS

CN 1631016 6/2005
GB 2360380 9/2001
(Continued)

OTHER PUBLICATIONS

Australian Patent Examination Report No. 1, dated May 20, 2016, Patent Application No. 201501425.
(Continued)

*Primary Examiner* — Kambiz Abdi
*Assistant Examiner* — Bolko Hamerski
(74) *Attorney, Agent, or Firm* — Kilpatrick Townsend and Stockton LLP

(57) ABSTRACT

Systems, gateway computers, and methods for using a gateway abstraction layer and application platform interfaces for conducting service transactions are disclosed. A gateway abstraction layer computers can receive service requests in multiple message formats or communication protocols, transform those service requests into other message formats to process the service using one or more networks or third-party service providers. The results of the service request can then be translated back to the message format in which the original service request was received. The gateway abstraction layer can be maintained using update messages received from service providers.

25 Claims, 12 Drawing Sheets

Related U.S. Application Data

(60) Provisional application No. 61/362,872, filed on Jul. 9, 2010.

(51) Int. Cl.
  *G06Q 20/08* (2012.01)
  *G06Q 20/10* (2012.01)
  *G06Q 20/40* (2012.01)

(58) Field of Classification Search
  USPC .......................................................... 705/44
  See application file for complete search history.

(56) References Cited

U.S. PATENT DOCUMENTS

| | | |
|---|---|---|
| 5,459,837 A | 10/1995 | Caccavale |
| 5,484,988 A | 1/1996 | Hills |
| 5,521,910 A | 5/1996 | Matthews |
| 5,655,008 A * | 8/1997 | Futch .................... G06Q 20/00 379/114.01 |
| 5,754,543 A | 5/1998 | Seid |
| 5,805,798 A | 9/1998 | Kearns et al. |
| 5,809,145 A | 9/1998 | Slik et al. |
| 5,850,446 A | 12/1998 | Berger et al. |
| 5,933,599 A | 8/1999 | Nolan |
| 5,974,460 A | 10/1999 | Maddalozzo, Jr. et al. |
| 5,978,840 A | 11/1999 | Nguyen et al. |
| 5,983,208 A | 11/1999 | Haller |
| 5,987,132 A | 11/1999 | Rowney |
| 6,000,832 A | 12/1999 | Franklin et al. |
| 6,006,264 A | 12/1999 | Colby et al. |
| 6,016,307 A | 1/2000 | Kaplan et al. |
| 6,023,684 A | 2/2000 | Pearson |
| 6,039,245 A | 3/2000 | Symonds et al. |
| 6,091,724 A | 7/2000 | Chandra et al. |
| 6,134,598 A | 10/2000 | Raman |
| 6,144,641 A | 11/2000 | Kaplan et al. |
| 6,160,874 A | 12/2000 | Dickerman et al. |
| 6,163,772 A | 12/2000 | Kramer et al. |
| 6,230,201 B1 | 5/2001 | Guck et al. |
| 6,302,326 B1 | 10/2001 | Symonds et al. |
| 6,304,915 B1 | 10/2001 | Nguyen et al. |
| 6,317,438 B1 | 11/2001 | Trebes, Jr. |
| 6,327,578 B1 * | 12/2001 | Linehan ................ G06Q 20/02 705/65 |
| 6,389,479 B1 | 5/2002 | Boucher et al. |
| 6,430,184 B1 | 8/2002 | Robins et al. |
| 6,456,594 B1 | 9/2002 | Kaplan et al. |
| 6,460,120 B1 | 10/2002 | Bass et al. |
| 6,473,404 B1 | 10/2002 | Kaplan et al. |
| 6,473,740 B2 | 10/2002 | Cockrill et al. |
| 6,487,286 B1 | 11/2002 | Reaves et al. |
| 6,535,488 B1 | 3/2003 | Mahe |
| 6,644,546 B2 | 11/2003 | George |
| 6,647,376 B1 | 11/2003 | Farrar |
| 6,732,175 B1 * | 5/2004 | Abjanic ....................... 709/227 |
| 6,754,188 B1 | 6/2004 | Garahi et al. |
| 6,788,688 B2 | 9/2004 | Trebes, Jr. |
| 6,802,067 B1 | 10/2004 | Camp et al. |
| 6,807,410 B1 | 10/2004 | Pailles et al. |
| 6,839,700 B2 | 1/2005 | Doyle et al. |
| 6,847,953 B2 | 1/2005 | Kuo |
| 6,886,166 B2 | 4/2005 | Harrison et al. |
| 6,980,970 B2 | 12/2005 | Krueger et al. |
| 7,047,285 B2 | 5/2006 | Burgess |
| 7,058,691 B1 | 6/2006 | Yu et al. |
| 7,131,123 B2 | 10/2006 | Suorsa et al. |
| 7,188,336 B2 | 3/2007 | Humphries |
| 7,225,156 B2 | 5/2007 | Fisher et al. |
| 7,228,333 B1 | 6/2007 | Smith |
| 7,237,255 B2 | 6/2007 | Fransdonk |
| 7,305,697 B2 | 12/2007 | Alao et al. |
| 7,356,615 B2 * | 4/2008 | Cai ...................... H04L 67/2823 709/223 |
| 7,426,730 B2 | 9/2008 | Mathews et al. |
| 7,457,778 B2 | 11/2008 | Li et al. |
| 7,577,599 B2 | 8/2009 | Sanchez et al. |
| 7,774,402 B2 | 8/2010 | Singh |
| 7,779,160 B1 | 8/2010 | Symonds et al. |
| 8,190,530 B2 | 5/2012 | Redmond |
| 8,229,812 B2 | 7/2012 | Raleigh |
| 8,321,526 B2 | 11/2012 | Raleigh |
| 8,392,933 B2 * | 3/2013 | Borghini et al. ............. 719/311 |
| 2001/0056401 A1 | 12/2001 | Tompkins |
| 2002/0016769 A1 | 2/2002 | Barbara et al. |
| 2002/0065774 A1 | 5/2002 | Young et al. |
| 2002/0083210 A1 | 6/2002 | Harrison et al. |
| 2002/0091844 A1 | 7/2002 | Craft et al. |
| 2002/0099562 A1 | 7/2002 | Bruce, Sr. et al. |
| 2002/0116530 A1 | 8/2002 | Burgess |
| 2002/0128917 A1 | 9/2002 | Grounds |
| 2002/0133412 A1 | 9/2002 | Oliver et al. |
| 2002/0141449 A1 | 10/2002 | Johnson |
| 2002/0174069 A1 | 11/2002 | LaBadie |
| 2002/0178112 A1 | 11/2002 | Goeller et al. |
| 2003/0004894 A1 | 1/2003 | Rowney et al. |
| 2003/0009382 A1 * | 1/2003 | D'Arbeloff ............ G06Q 20/02 705/17 |
| 2003/0018579 A1 | 1/2003 | Litster et al. |
| 2003/0061404 A1 * | 3/2003 | Atwal et al. ................. 709/328 |
| 2003/0065623 A1 | 4/2003 | Corneil et al. |
| 2003/0093479 A1 | 5/2003 | Mellen-Garnett et al. |
| 2003/0153338 A1 | 8/2003 | Herz et al. |
| 2003/0158951 A1 | 8/2003 | Primak et al. |
| 2003/0163585 A1 | 8/2003 | Elderon et al. |
| 2003/0169749 A1 | 9/2003 | Huang et al. |
| 2003/0210694 A1 | 11/2003 | Jayaraman et al. |
| 2003/0221000 A1 | 11/2003 | Cherkasova et al. |
| 2003/0223408 A1 | 12/2003 | Chen et al. |
| 2004/0015511 A1 | 1/2004 | Seefeldt et al. |
| 2004/0039693 A1 | 2/2004 | Nauman et al. |
| 2004/0153511 A1 | 8/2004 | Maynard et al. |
| 2004/0172254 A1 | 9/2004 | Sharma et al. |
| 2004/0267660 A1 | 12/2004 | Greenwood et al. |
| 2005/0005306 A1 | 1/2005 | Kim et al. |
| 2005/0015336 A1 | 1/2005 | Yeates et al. |
| 2005/0027610 A1 | 2/2005 | Wharton |
| 2005/0049974 A1 | 3/2005 | Jani et al. |
| 2005/0065881 A1 * | 3/2005 | Li ........................ G06Q 30/0641 705/40 |
| 2005/0071235 A1 | 3/2005 | Nguyen et al. |
| 2005/0080850 A1 | 4/2005 | Salesky et al. |
| 2005/0177515 A1 | 8/2005 | Kalavade et al. |
| 2005/0193078 A1 | 9/2005 | Jordan |
| 2005/0251469 A1 * | 11/2005 | Nandakumar ......... G06Q 20/02 705/35 |
| 2005/0256802 A1 | 11/2005 | Ammermann et al. |
| 2005/0278270 A1 | 12/2005 | Carr et al. |
| 2006/0030313 A1 | 2/2006 | Massie et al. |
| 2006/0080120 A1 | 4/2006 | Tcherevik |
| 2006/0149671 A1 * | 7/2006 | Nix ........................... G06Q 20/04 705/40 |
| 2006/0167818 A1 | 7/2006 | Wentker et al. |
| 2006/0222003 A1 | 10/2006 | Majumdar |
| 2006/0242085 A1 | 10/2006 | Jones et al. |
| 2006/0248009 A1 | 11/2006 | Hicks et al. |
| 2006/0282382 A1 * | 12/2006 | Balasubramanian .. G06Q 20/02 705/44 |
| 2006/0288394 A1 | 12/2006 | Thomas et al. |
| 2007/0027784 A1 | 2/2007 | Kahn et al. |
| 2007/0083675 A1 | 4/2007 | Vemulapelli et al. |
| 2007/0185822 A1 | 8/2007 | Kaveti et al. |
| 2007/0223444 A1 | 9/2007 | Foo et al. |
| 2007/0233603 A1 | 10/2007 | Schmidgall et al. |
| 2007/0276765 A1 | 11/2007 | Hazel et al. |
| 2008/0086417 A1 * | 4/2008 | Bykov .................. G06Q 20/102 705/40 |
| 2008/0103923 A1 * | 5/2008 | Rieck et al. ................... 705/26 |
| 2008/0114657 A1 | 5/2008 | Forzley |
| 2008/0120235 A1 | 5/2008 | Chu |
| 2008/0127169 A1 * | 5/2008 | Malasky et al. ............. 717/174 |
| 2008/0147565 A1 | 6/2008 | Huang et al. |
| 2008/0162351 A1 | 7/2008 | LaBadie |
| 2008/0177826 A1 | 7/2008 | Pitroda |

(56) References Cited

U.S. PATENT DOCUMENTS

| | | | |
|---|---|---|---|
| 2009/0024471 A1* | 1/2009 | Nielson et al. | 705/14 |
| 2009/0037290 A1 | 2/2009 | Keithley et al. | |
| 2009/0076864 A1 | 3/2009 | Kahn et al. | |
| 2009/0076953 A1 | 3/2009 | Saville et al. | |
| 2010/0063926 A1* | 3/2010 | Hougland | G06Q 20/10 705/42 |
| 2010/0088206 A1 | 4/2010 | Lister | |
| 2010/0174620 A1 | 7/2010 | Stringfellow et al. | |
| 2010/0174626 A1 | 7/2010 | Stringfellow et al. | |
| 2010/0202450 A1* | 8/2010 | Ansari | G06Q 30/04 370/389 |
| 2010/0241712 A1* | 9/2010 | Nitzsche | H04L 67/16 709/206 |
| 2011/0035676 A1 | 2/2011 | Tischer et al. | |
| 2011/0047294 A1 | 2/2011 | Singh | |

FOREIGN PATENT DOCUMENTS

| | | |
|---|---|---|
| JP | 5-244249 | 9/1993 |
| WO | 0124087 | 4/2001 |
| WO | 01/95695 | 12/2001 |
| WO | 2006023745 | 3/2006 |
| WO | 2008007939 | 1/2008 |
| WO | 2010074851 | 7/2010 |
| WO | 2010089593 | 8/2010 |

OTHER PUBLICATIONS

Decision on Grant, dated Apr. 12, 2016, Application No. 2013105470/08(008175).
Oracle Reference 11g Release 2(11.2), E15886-02; "Oracle Communications Data Model"; May 2010; pp. 1-672. cited by examiner.
International Application No. PCT/US2011/043586, International Search Report and Written Opinion dated Jul. 11, 2012, 10 pages.
"Five Essences Holding a Key to Success in Service on the Web,"; N+1 Network Guide; Dec. 18, 2001; pp. 64-69; vol. 2, No. 1.
Kurasugi, Toshiyasu et al.; Development of Layer-8 Switch to Realize Quick We Respones,; NEC Technical Journal; Sep. 25, 2003; pp. 10-14; vol. 56; No. 8, with machine translation.
Russian Office Action and English translation for Russian Application No. 2008103283, dated Jul. 2010, 15 pages.
Australian Office Action dated Oct. 27, 2010 from AU Patent Application No. 2006263434, 2 pages.
Russian Office Action and English translation for Russian Application No. 2008103283, dated Nov. 2010, 19 pages.
Chinese Office Action and English translation for Chinese Application No. 200680031304.8, dated Nov. 12, 2010, 20 pages.
Japanese Office Action dated Jun. 9, 2011 for Japanese Patent Application No. 2008-519668, with English Translation, 5 pages.
Mexican Office Action dated Aug. 16, 2011 and English translation.
Australian Office Action dated Aug. 23, 2011 from AU Patent Application No. 2006263434, 2 pages.
Search/Examination Report dated Dec. 14, 2011 from European Patent Application No. 06786167.4, 8 pages.
Australian Notice of Acceptance dated Jan. 20, 2012 from AU Patent Application No. 2006263434, 3 pages.
Chinese Office Action mailed on Mar. 22, 2012 for Chinese Patent Application No. 200680031304.8, with English translation, 7 pages.
Korean Office Action dated Aug. 8, 2012 for KR Patent Application No. 20087002320, with English Translation, 11 pages.
U.S. Appl. No. 13/180,391 , "Notice of Allowance", dated May 20, 2013, 11 pages.
U.S. Appl. No. 13/180,391 , "Non-Final Office Action", dated Nov. 7, 2012, 10 pages.
Australian Patent Application No. 2011274418 , "First Examiner Report", dated Jun. 27, 2014, 3 pages.
Australian Patent Application No. 2011274418 , "Notce of Acceptance", dated Dec. 10, 2014, 2 pages.
Australian Patent Application No. 2015201425 , "Notce of Acceptance", dated Mar. 1, 2017, 2 pages.
Russian Patent Application No. 2013105470 , "Office Action", dated Aug. 31, 2015, 7 pages.

* cited by examiner

GATEWAY ABSTRACTION LAYER

CROSS-REFERENCES TO RELATED APPLICATIONS

The present application is a continuation of U.S. patent application Ser. No. 13/180,391, filed on Jul. 11, 2011, which claims priority to U.S. Provisional Patent Application No. 61/362,872, filed on Jul 9, 2010 all of which are herein incorporated by reference in their entirety for all purposes.

BACKGROUND OF THE INVENTION

Users, such as independent and corporate merchants, use various services to accept and process payments and other financial transactions. Merchants that fail to adopt popular payment services, or decide to operate on a "cash only" basis, may actually lose out on potential business because many potential consumers prefer to make purchases using credit, debit, ATM and gift cards, as well as other forms of non-cash payment. In fact, the ability to run a profitable business can hinge on a merchant's ability to accept as many forms of payment as possible.

However, due to the subscription and/or transaction costs associated with accepting each brand and type of payment service offered by various payment networks, some merchants will elect to only accept and process some small portion of the available services from a limited number or payment networks. For example, an independent online merchant may find the cost of accepting all of the payment services offered by Visa™, Mastercard™, American Express™, Discover™, and possibly other brands of payment services, prohibitively expensive. In addition to the direct costs and fees associated with subscribing to or using the various payment networks, there are additional incremental overhead costs associated with each additional payment network adopted by a merchant.

For example, each payment network or service can have separate and distinct compliance and operational requirements. Each payment network typically includes its own unique set of practices and procedures with which the merchant must comply in order to use that particular payment network. Currently, there is no standard communication protocol for interacting with payment networks. Accordingly, integrating and managing the requisite procedures and practices for each additional payment network a merchant uses adds additional operating costs in the form of additional head count or in the form of the merchant's or the merchant's employee's time.

Subscribing to multiple payment networks requires keeping up with different transaction request formats, interface standards, connectivity models, and reporting, settlement and reconciliation procedures required by each payment network. Managing the various requirements can easily overwhelm the capabilities and resources of some merchants and can cause merchants, especially smaller merchants, to limit the total number of payment networks to which they subscribe and, consequently, the number of payment forms they accept.

The potential expense and hardship of using multiple payment networks is further compounded by the fact that the various payment networks periodically publish business operation updates in which they change, add or otherwise augment the various compliance requirements. Each time any one of the payment networks changes requirements, merchants have to update their own internal procedures, systems, and protocols. Since each payment network publishes business operation updates on its own schedule, a merchant can end up constantly making internal updates as it makes changes to comply with the new requirements of each payment network as they are announced.

Some intermediary payment services, such as PayPal™, have emerged to help online merchants to accept a wider range of payment options while reducing the cost and complexity of accepting more forms of payment. However such intermediary payment services are less than ideal for attracting customers because they often require consumers to create accounts with the intermediary payment service and then register their preferred payment accounts before being able to make any purchases with a merchant. Because of the extra registration steps involved and the fact that typical intermediary payment services permanently store consumer payment account information, some consumers do not like or trust intermediary payment service providers and are reluctant to deal with online merchants that only accept payment through intermediary payment service providers. In addition, many intermediary payment service providers have had a difficult time addressing the needs of traditional brick-and-mortar merchants because most intermediary payment services require web-based transactions to work effectively.

Furthermore, when a merchant limits the number of payment networks it uses, it effectively limits the number and types of ancillary financial service to which it has access. For example, a merchant may choose to accept Visa™ and Mastercard™ credit cards to capture the largest share of potential cardholder sales, but may know that it would benefit from fraud and risk services offered by another payment network or third-party service provider to which it has no access. Currently, there is no way for a merchant, small or otherwise, to quickly and cost effectively customize the ancillary financial service it receives when they subscribe to a particular payment network. Merchants are effectively locked into the offerings of the payment networks they choose to use for accepting payments.

Embodiments of the present invention address these and other deficiencies.

BRIEF SUMMARY OF THE INVENTION

Embodiments of the present invention are directed toward a gateway abstraction layer (GAL) gateway for providing multiple services from multiple transaction service providers to a plurality of service requestors using a gateway abstraction layer (GAL). The GAL gateway includes a processor, a service requestor interface, a service provider interface, a back end or payment network interface and an abstraction layer database. The processor, the transaction requestor interface, the transaction service provider interface, the back end or payment network interface and the abstraction layer database can be coupled to one another. The transaction requestor interface can be configured to receive service requests, including service request data, from the plurality of service requestors using a first application platform interface (API). The service provider interface is configured to communicate with a plurality of transaction service providers using a second API. The back end or payment network interface is configured to communicate with a plurality of acquirers, payment processors, or proprietary payment networks using a lookup table of communication standards in the abstraction layer database.

In some embodiments, the processor is configured to receive the transaction authorization requests from the transaction requestor interface, parse the transaction service requests data from the transaction authorization requests, initiate service calls to the plurality of transaction service providers based on the transaction service request data using the second API, and send results from the service calls to one or more of the transaction requestors using the first API and the transaction requestor interface, or to one or more of the plurality of acquirers, payment processors or proprietary payment networks using the back end or payment network interface and the lookup table of communication standards. The processor is further configured to send the transaction authorization request to at least one of the plurality of acquirers, payment processors, or proprietary payment networks.

Other embodiments of the present invention are directed toward methods for providing transaction services to a plurality of service requestors using a gateway server. The method includes receiving a service request from one of a plurality of service requestors over a first application platform interface (API), parsing service request data from the service request using the gateway server, then accessing an abstraction layer database to determine one or more transaction services using the gateway server. Based on information contained in the abstraction layer database, sending a service call based on the service request data to one or more service providers over a second API using the server. In response to the service call, receiving results from the service providers and sending the results to the service requestor, an acquirer, payment processor or a proprietary transaction network.

DETAILED DESCRIPTION OF THE INVENTION

Figure 1:
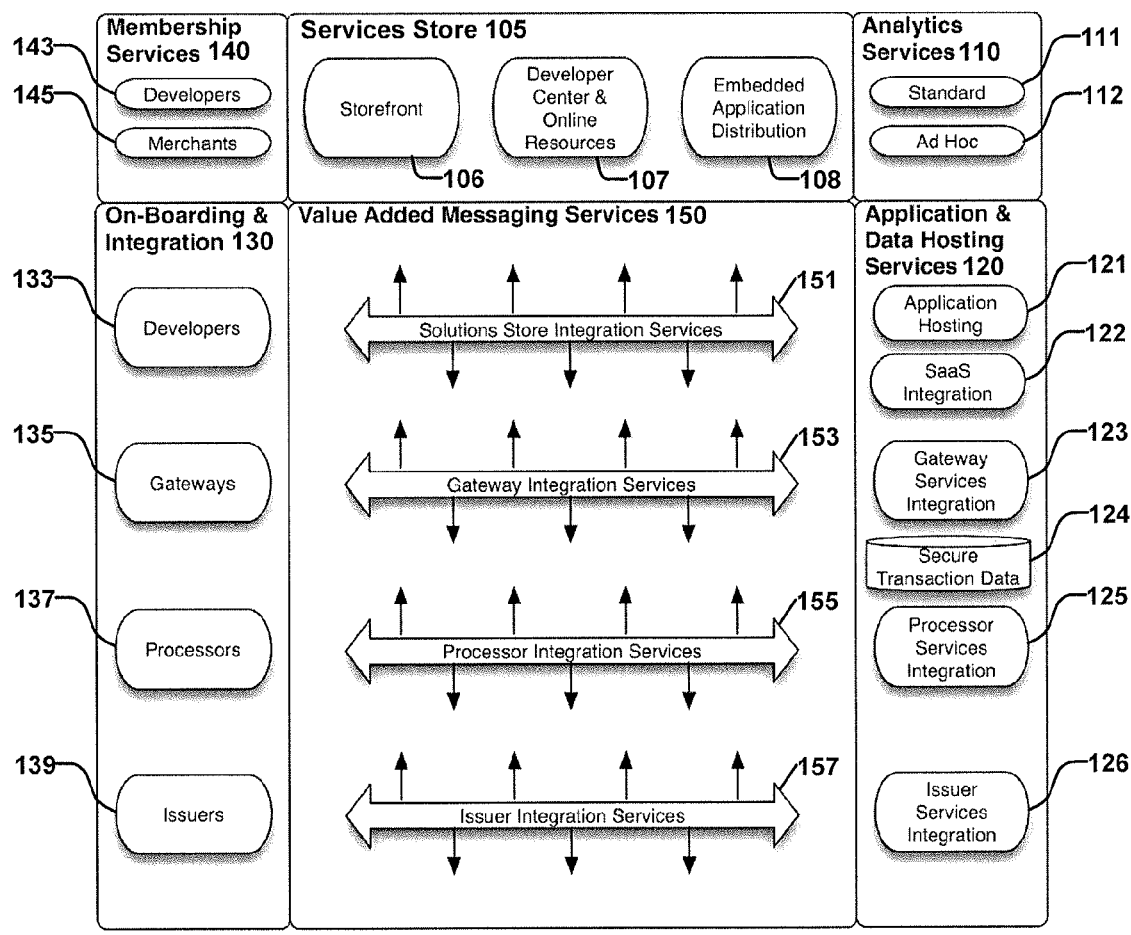
FIG. 1 is a block diagram of a gateway abstraction layer (GAL) gateway server according to various embodiments of the present invention.

Embodiments of the present invention are directed toward systems, methods, gateways and servers for providing the messaging, switching, translation and routing of transaction messages and requests between transaction requestors, payment processing networks and third party service providers. As used herein, the term transaction or service requestor can refer to any entity, system, or system component that can request transaction authorization or other services. Such entities and systems can include, but are not limited to, merchants, issuers, acquirers, and payment processors. In various embodiments, translation of transaction requests or services is provided by a transaction gateway having an abstraction layer and other internal logic. The gateway abstraction layer can be resident in a gateway computer or gateway server computer, and thus is referred to herein as a gateway abstraction layer.

The Gateway abstraction layer ("GAL") can include various components, subsystems and logic for translation standards and mappings to translate the various incoming transaction requests from transaction requestors into the appropriate calls to and file formats for third-party service providers and the many available varieties, types and brands of payment networks.

In various other embodiments, a payment processing gateway having a gateway abstraction layer (GAL) can offer open or standardized or canonical communication and transaction request formats, protocols and procedures to transaction requestors, such as merchants and third-party service providers. The use of such standardized or canonical message and file formats and communication standards serves to simplify the actual communication between the transaction requestors, third-party service providers and payment networks. Each respective connection or interface between the merchants, third-party service providers and payment networks to the GAL server computer, can include a general communication standard or a gateway specific application platform interface (API). In some embodiments, a "layer" may be associated with a function or a protocol operating at a particular level within a network or system architecture. A layer may be implemented by any suitable combination of hardware and software.

From the perspective of the merchants and third-party service providers, the gateway provides an easier, faster, more efficient and less expensive way in which to interact with each other and the payment networks. The merchants and third-party service providers can comply with a single communication standard and yet still be able to interact, process, send and receive transaction service requests and transaction authorization requests to and from any and all of the available payment processing networks, as well as one another. The following description of various embodiments in reference to the figures illustrates the features and advantages. The description of the embodiments is intended to be exemplary, and should not be construed to limit the scope of the invention.

FIG. 1 is a block diagram of a GAL gateway 100 according to various embodiments. As shown, GAL gateway 100 can include various modules or layers that can provide and/or host various services for different entities, systems and system components connected to the GAL gateway 100. GAL gateway 100 can include a services store layer 105, and analytics services layer 110, application and data hosting services layer 120, on-boarding an integration layer 130, membership services layer 140 and value added messaging services layer or abstraction layer 150. The various components and layers of GAL gateway 100 can include various computing components including, but not limited to, hardware, firmware, software, as well a networks of connected computers and server computers configured to execute instructions to perform the functions of the various layers. In embodiments that include networked computers or server computers, each computer can be connected to one another via networking connections, such as Ethernet, IEEE 802.11x, ISDN, and other open standard and proprietary network protocols and connections.

In some embodiments, services store layer 105 can provide an interface to merchants and third-party service providers, such as software developers and software as service (SaaS) providers. The storefront of services store layer 105 can be a website or other online resource portal that allows third-party service providers to upload/register their products or service and merchants and other users to choose the various software/services to which they would like to subscribe or otherwise use. The services store layer 105 can include application platform interfaces (APIs) for linking outside entities, computers and components to the various services offered in the services store layer 105. In such embodiments, the APIs hosted or offered by the services store layer 105, or other layer or component of the GAL gateway 100, can include multiple APIs that are specific to or designed for the simple integration of the selected services into the legacy, existent or modified operations of the entity, system or computer of the subscribing entity. While such functionality is described above in reference to the service store layer 105, other embodiments provide the translation between one API and another via the value added messaging service layer 150 or the application and data hosting For example, a subscribing entity, such as a retail merchant can have or run an online storefront hosted at a remote server that include various function or SaaS calls or other messaging to an external payment processing service, such as PayPal™, that are accessed using an API specific to that payment processing service via a specific URL or IP address. The service store layer 105 can provide access to one or more alternative or analogous services provided by the external payment processing service by providing the subscribing entity with a different URL or IP address to send the function or SaaS calls or other messages using the same external payment processing service specific API. The services store layer 105 or some other component or layer of GAL gateway 100 can then translate from the external payment processing service specific API to another format or protocol for use internally to the GAL gateway or into another format or protocol for use by another entity, such as another merchant, issuer, acquirer, payment processing network or third-part service provider, etc. Such features of the GAL gateway 100 let subscribing entities to make fast and cost effective switches from services from an external service provider to services provided by or hosted on the GAL gateway with little to no interruption of the subscribing entities business or internal practices and procedures. All the subscribing entity may need to do is to replace the target URL or IP address to which it sends request message or function or SaaS calls.

A merchant, or other subscribing entity, can also use the services store layer 105 to select specific payment networks through which to accept payments. Similarly, a merchant can use the services store layer 105 to select specific third-party transaction services which can process payments through one or more payment networks. In some embodiments, storefront 106 of services store layer 105 can be configured to allow merchants to select to use or receive standard or predetermined packages of transaction services made available by third-party service provider or any of the payment networks to which they choose to subscribe. Merchants can also choose to customize the transaction services by selecting al la carte services registered with the GAL gateway 100 and made available by individual developers, third-party service providers and each of the payment networks through services store layer 105. The transaction services that third-party service providers and payment networks can provide through services store layer 105 of GAL gateway 100 can include, but are not limited to, payment processing, fraud detection, risk management, scoring, loyalty programs, offer programs, partnerships/cooperation programs, and other financial, insurance, banking and commerce related services.

For example, a small merchant, such as an independent jewelry merchant, may wish to use a particular risk management service directed specifically at merchants who deal in high-value single-purchase items. Such a risk management service may not be available from the particular branded payment networks to which the jewelry merchant subscribes for accepting payments. Using various embodiments of the services store layer 105, the jewelry merchant can choose to use that particular risk management service made available by some third-party developer or a payment network to which it does not regularly subscribe. For example, the merchant can access a website connected to or resident in the services store 105 using a client computer or other computing device, such as a mobile or smart phone.

The manner in which a merchant can use the various transaction services made available through the services store layer 105 can vary according to the offerings of the GAL gateway 100 and agreements its operator has with the third-party service providers and payment networks. However, according to various embodiments of the present invention, these services need not be limited except that they can be required to comply with a specified communication or processing protocol or API.

In some embodiments, a transaction service can be offered as an in-line service in which a specific call is made to SaaS or other service provider each time the merchant sends a transaction authorization request to a payment network through GAL gateway 100. In this way the transaction service can run in parallel, before, while or after the transaction authorization request is sent to a specific payment network. One advantage of such an embodiment is that it allows the merchant to decline a transaction, and thus avoid the cost of completing the authorization request, based on the results returned from the SaaS provider before the authorization request is sent to the payment network.

Using the jewelry merchant example again, the jewelry merchant can use the storefront 106 to specify that the GAL gateway 100 is to send the requisite transaction service request data parsed from a transaction authorization request to a particular SaaS provider it has selected. The SaaS provider can make services available through the developer center and online resources layer 107. In some embodiments, GAL gateway 100 can send transaction service request data to the SaaS provider and await a positive result before the transaction authorization request is sent to a particular payment network. In this way, the jewelry merchant can avoid the cost of completing the transaction authorization request and simply decline the transaction. Accordingly, merchants can benefit from the third-party services which help them avoid potential costs and risks associated with a particular transaction and the unnecessary transaction authorization request. Third-party service providers, that may be developing highly specialized and/or effective transaction services, benefit by gaining access to the merchants using the services store layer 105.

In other embodiments, merchants such as the jewelry merchant, can choose an embedded solution for using various transaction services made available by the embedded application distribution capabilities 108 in the services store layer 105. In such embodiments, developers can offer software, code or portions thereof for download to merchant websites, point-of-sale devices, computers, PDAs, cell phones or smart phones that the merchant uses for accepting payments. A merchant can either run the software or code itself or have it hosted on a remote server to invoke the transaction services application provided through the embedded application distribution layer 108.

For example, an online merchant might receive a piece of code, i.e. a segment of Java code, to include in their website. This code can be run each time a consumer initiates a payment request using the website. In some embodiments, the Java code might be a simple call out to a SaaS provider while in other embodiments, the application can run in standalone mode to provide various services to the merchant each time a transaction request is initiated using the website or a point-of-sale device. Various examples of the standalone transaction service applications can include customer survey applications, website evaluation applications, special offer applications, and large-scale inter-brand corporate partnership applications.

The developer center and online resources module 107 in the services store layer 105 can provide an interface and support to third-party transaction service providers. As mentioned above, the third-party transaction service providers can offer their products and services as either in-line or embedded solutions to merchants, payment processors and the payment networks. In some embodiments, the third-party transaction service providers may be required to be certified by the GAL gateway 100. In other embodiments, any and all third party service providers can offer their products and services as uncertified third-party service providers as long as they comply with the requirements of the third-party service provider API or other interface.

Analytics services layer 110 can offer a standard 111 or ad hoc 112 types of analytics services. The analytics services offered by analytics services layer 110 can include the standard transaction and payment analytics offered by any of the branded payment networks. In other embodiments, analytics services layer 110 can offer ad hoc 112 analytics services to merchants. In some embodiments the ad hoc 112 services can include customized or customizable systems designed by or for a specific merchant. Analytics services 110 can be connected to and called on by any of the layers in services store layer 105.

GAL Gateway 100 can also include an application and data hosting services layer 120. In embodiments including an application and data hosting services layer 120, GAL gateway 100 can provide various services to merchants, third-party service providers and payment networks including, but not limited to, application hosting 121, SaaS integration 122, gateway services integration 123, secure transaction data 124, processor services integration 125 and issuer services integration 126.

An additional layer to GAL gateway 100 can be an on-boarding and integration layer 130. On-boarding and integration layer 130 can include interfaces, portals and support to developers 133, external gateways 135, processors 137 and issuers 139 for connecting, invoking or routing transaction authorization requests or transaction service requests through GAL gateway 100. Using the on-boarding and integration layer 130, merchants, developers, external gateways, payment processors and issuers can all see and use a consistent interface to interact with one another. In other words, each merchants, developer, gateway, payment processor or issuer will need only to comply with the requirements of GAL gateway 100 in order to interact with any of the other entities, services, servers or networks connected to the GAL gateway 100. This can greatly reduce the complexity of doing business, especially in regard to accepting multiple payment options and using multiple transaction services from different entities.

GAL Gateway 100 can also include a membership services layer 140. Membership services layer 140 can include an information portal for developers 143 and merchants 145. Using membership services layer 140, developers 143 and merchants 145 can register their particular information, update server and hosting information, resolve issues with the GAL gateway 100 and potentially any of the other entities connected to gateway 100. Merchant services layer 140 can also include billing, disputes, settlements, reconciliation and reporting information and services to developers 143 and merchants 145.

Finally, GAL gateway 100 can include a value added messaging services layer or abstraction layer 150. Value added messaging services layer, or abstraction layer, 150 depicts the communication capability and interconnectivity between services store layer 105, analytics services layer 110, application and data hosting services layer 120, on-boarding and integration layer 130, membership services layer 140 and external merchants, third-party service providers and payment networks.

For instance, solutions store integration services 150 can communicate with gateway integration services 153, processor integration services 155 and issuer integration services 157. In turn, each one of the services 151, 153, 155 in 157 in the value added messaging services layer 150 can communicate, either directly or indirectly, with each of the other layers of GAL gateway 100 or any of the other connected entities external to GAL gateway 100, such as merchants, payment processors, issuers, acquirers and payment networks. The abstraction layer/value added messaging services layer 150 can include translation services between the various formats, protocols and connectivity models for messaging, routing and switching transaction authorization requests and third-party service calls among the various entities.

In some embodiments, the translation services include a mapping between the formats of a incoming transaction authorization request from a merchant or payment processor and the requirements of the target payment network. For example, a transaction authorization request can be received at the GAL gateway 100 from a merchant. The transaction authorization request can be in a first format and include a first set of information. The value added messaging services layer 150 can parse the first set of information from the first format of the transaction authorization request, and then translate it into a second format including a second set of information, which may or may not include all the information in the first set of information, suitable for or required by the payment network. In other embodiments, the value added messaging services layer 150 can also parse out information from the first set of information and construct a third format message or data file to be sent to or used in invoking a third party service from one or more third-party service providers.

Translating the information from the first format to the second and third formats can be accomplished in a number of ways. In some embodiments, the translation or mapping from the first format to the second and third formats can be accomplished using a lookup table of communication standards or APIs, while in other embodiments, the translation can be achieved using a particular parsing routine or algorithm. Formulaic translations between a first format and a second format and third format can include additional security features and/or encryption routines to further secure transaction data from being intercepted by unauthorized entities.

FIGS. 2-7 are block diagrams of various systems for processing financial transactions, i.e. payment transactions, according to various contemporary systems and embodiments of the present invention. For clarity and ease of reference, elements depicted in FIGS. 2-7 having identical or similar functions, characteristics or capabilities are referenced using consistent reference numbers in each of the figures.

Figure 2:
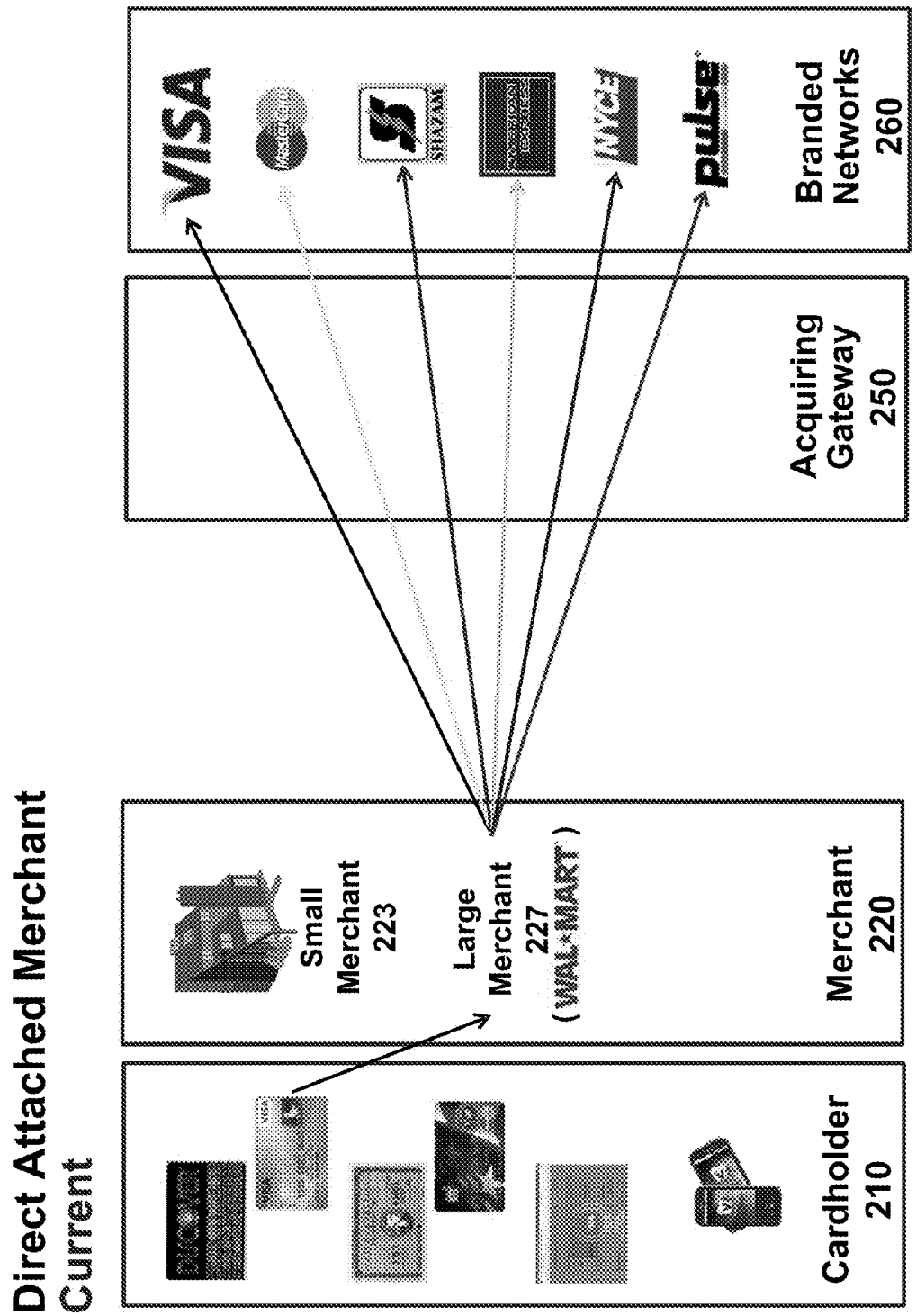
FIG. 2 is a block diagram of a contemporary payment processing system that can be improved by various embodiments of the present invention.

FIG. 2 is a block diagram of a system for processing payments using multiple payment networks in which merchants are directly connected to payment networks. The direct attached merchant system has several layers including, but not limited to, a cardholder layer 210, a merchant layer 220 and a branded network layer 260. In such systems, consumers can be issued various forms of payment accounts. The payment accounts can include credit, debit, ATM, online and personal computing device type payment accounts. The consumer can choose to use one of these payment accounts to initiate a payment or other financial transaction with a merchant in merchant layer 220. As shown, merchant layer 220 can include both small merchants 223, such as an independent music store, and large merchants 227, such as Wal-Mart™, and can be connected directly to the payment networks in branded networks layer 260.

It is not uncommon for large merchants 227 to be directly connected to the payment networks in the branded networks layer 260 for processing financial transactions. When a merchant in merchant layer 220 reaches a certain size and conducts a certain threshold number of financial transactions using each of the payment networks, the number of transactions, depth of resources and the economy of scale available to large merchants 227 can often justify the expense and overhead of maintaining direct connections which each of the payment networks. It is much less likely that the small merchants 223 will have the resources or requisite number of sales to justify maintaining direct connections with the payment networks and branded networks layer 260.

Figure 4:
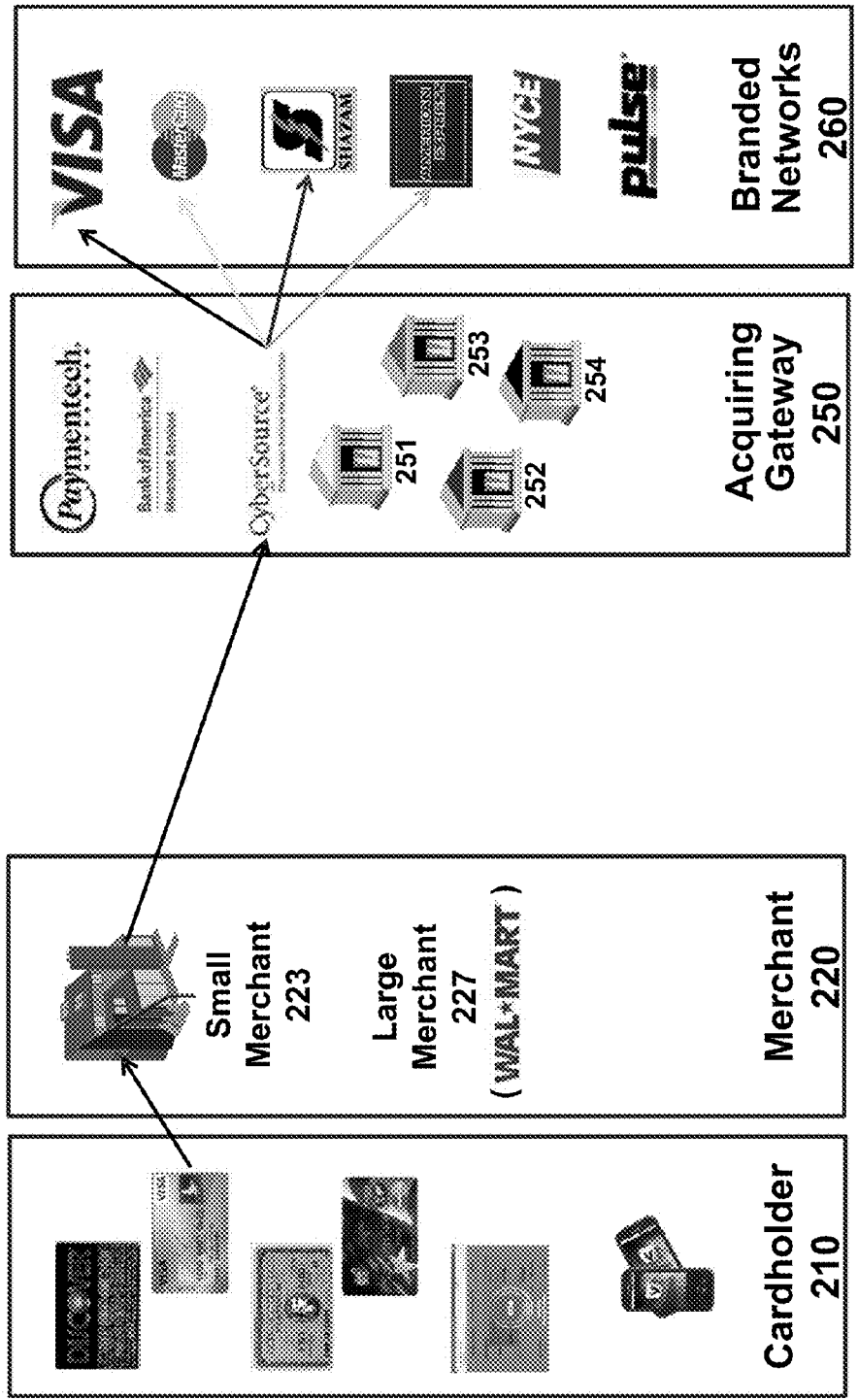
FIG. 4 is a block diagram of a payment process system that can be improved by various embodiments of the present invention.
Figure 5:
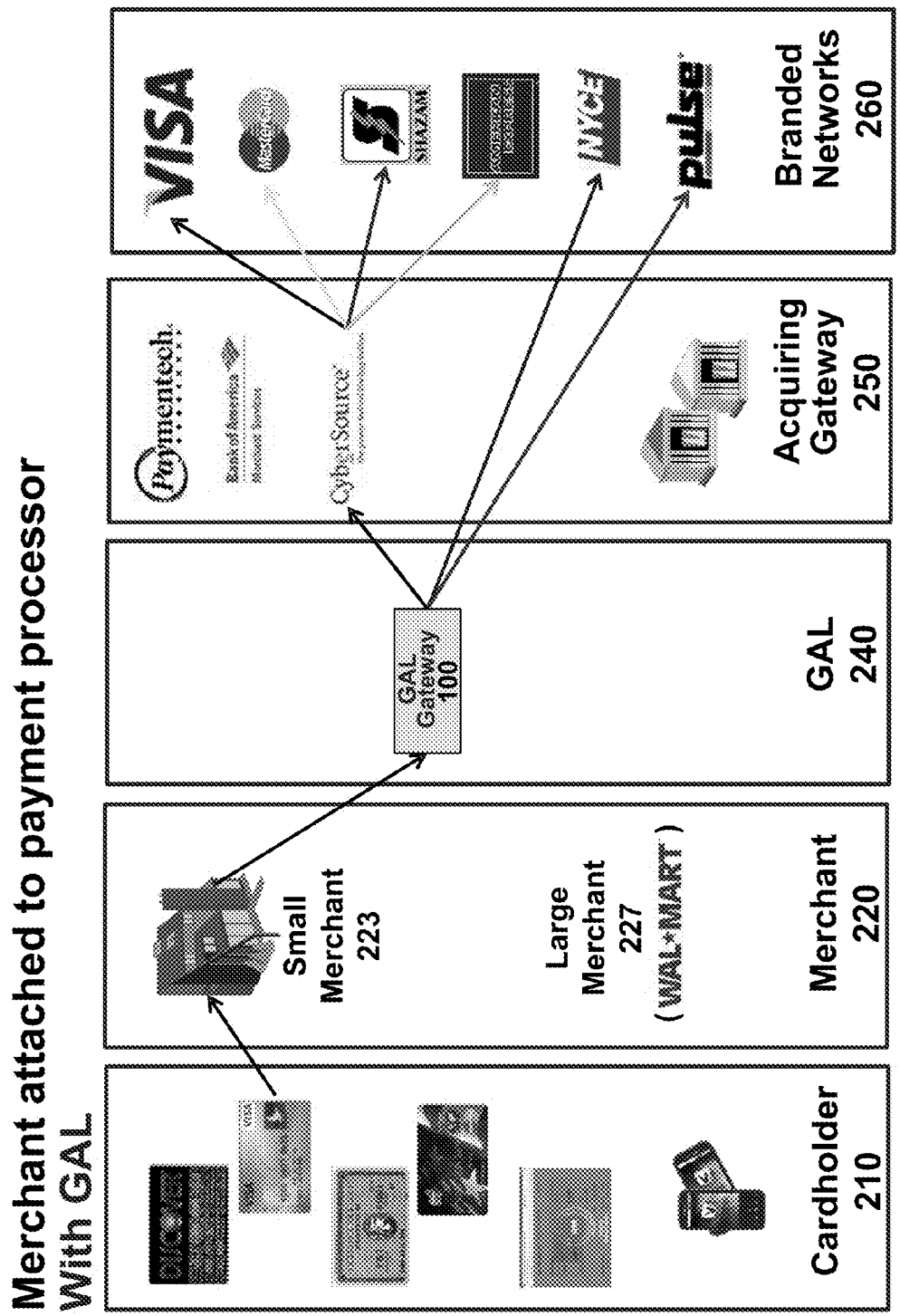
FIG. 5 is a block diagram of a payment processing system including a GAL gateway according to various embodiments of the present invention.

For small merchants 223, it makes more business sense to run their financial transactions through an acquirer gateway or a gateway abstraction layer gateway as shown in FIGS. 4-5 discussed below. Various embodiments of the present invention address the cost and complexity of both small merchants 223 and large merchants 227 in merchant layer 220 involved with being directly connected to the payment networks in branded networks layer 260.

Figure 3:
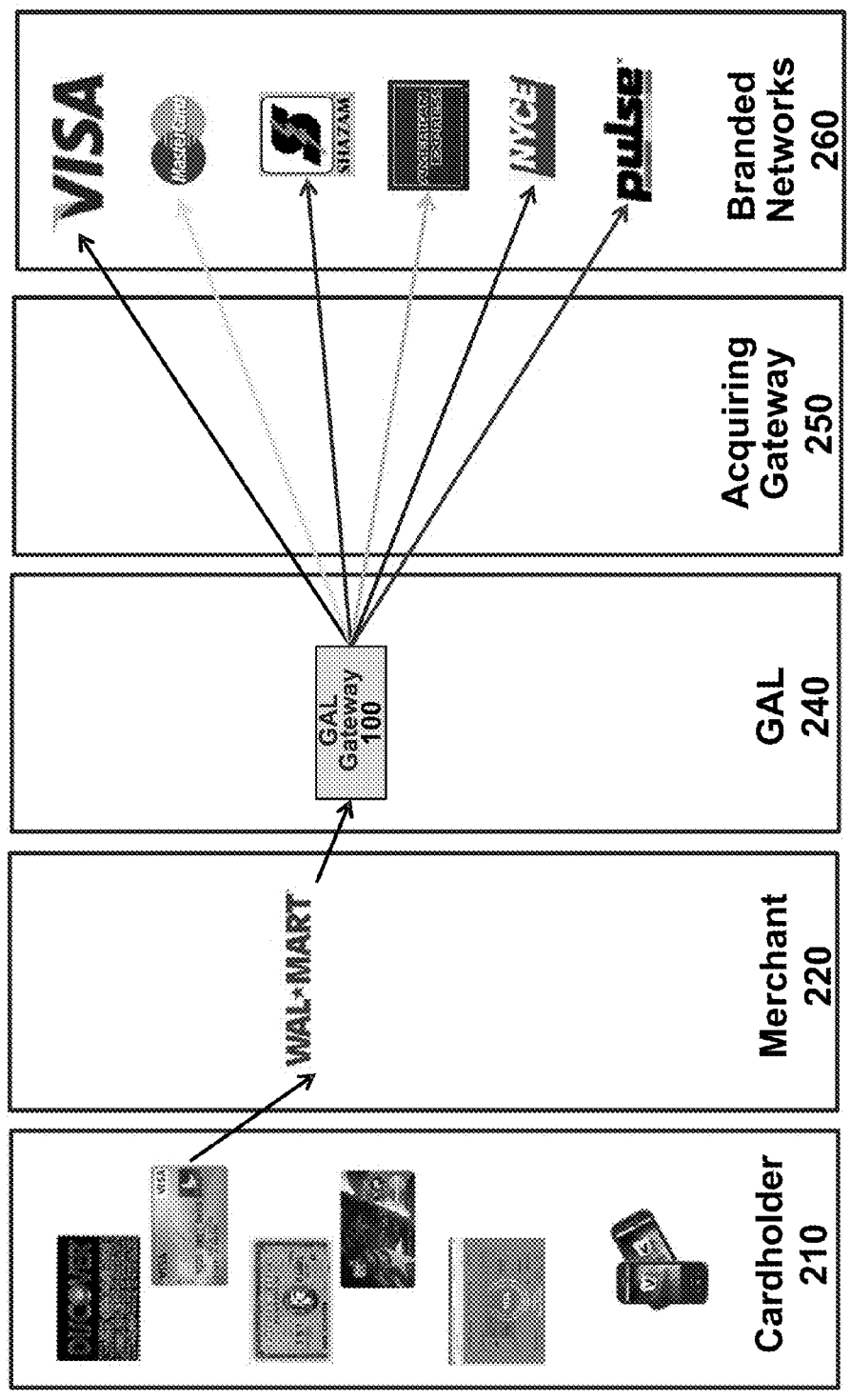
FIG. 3 is a block diagram of a payment processing system including a GAL gateway according to various embodiments of the present invention.

FIG. 3 is a block diagram of a system that uses a gateway abstraction layer 240 including a gateway abstraction layer gateway (GAL gateway) to simplify, speed up and reduce the cost associated with directly attaching a merchant in merchant layer 220 with the payment networks in branded networks layer 260. As shown in FIG. 3, this particular system includes a cardholder layer 210, a merchant layer 220, and a branded networks layer 260 as in FIG. 2 with the addition of a gateway abstraction layer 240 which can include a gateway abstraction layer (GAL) gateway 100. Acquiring gateway layer 250 is shown to indicate that a direct connection between the GAL gateway 100 in the gateway abstraction layer 240 and the payment networks in the branded networks layer 260 can completely bypass the any acquirers in acquiring gateway layer 250.

In such embodiments, merchants in the merchant layer 220 can receive a transaction request from one or more account holders in cardholder layer 210. As mentioned above, account holders can use a variety of consumer payment accounts such as credit cards, debit cards, ATM cards, online payment sites, and personal computing device-based payment systems to initiate a purchase or other financial transaction with merchants in the merchants layer 220, such as small merchants 223 or large merchants 227.

GAL gateway 100 can offer the merchants in the merchant layer 220, through the various layers and modules of the GAL gateway 100, a uniform interface through which to process transaction authorization requests and specify various transaction services. From the merchants' perspective, they need only to format the transaction authorization request, which can include requests for other transaction services, according to a single transaction authorization request format, protocol, or connectivity model according to the requirements of the GAL gateway 100 or the gateway abstraction layer. There is no need to track and/or manage the requirements for submitting transaction authorization requests for each of the payment networks. The GAL gateway 100 can manage the requirements of each of the payment networks and make the appropriate translations from the transaction authorization requests received from the merchants into the required formats, protocols and connectivity models for the intended payment network.

In some embodiments, the interface requirements of the GAL gateway 100 can be uniform across all merchants. In other words, every merchant can use the same format, protocol or connectivity model for communicating transaction authorization request to the GAL gateway 100. In some embodiments, this can include offering an application platform interface (API) into or onto which each merchant can build its own transaction handling system. Any calls made from the merchants' transaction handling system can be generated in the format required by the API.

Once the GAL gateway 100 receives a transaction authorization request from a merchant in the merchant layer 220, it can translate that transaction authorization request into a format, protocol or connectivity model required by the intended payment network in the branded networks layer 260. This translation can be based on a database or lookup table mapped to a payment network identifier included in the transaction authorization request received from the merchant. The GAL gateway 100 can parse out the payment network identifier and other transaction authorization request data from the transaction authorization request and retrieve data regarding the requirements for submitting a transaction authorization requests to the intended payment network. The data retrieved regarding the requirements for submitting a transaction authorization request to a particular payment network can include specifications for file format, transfer protocols, routing information, network gateways, network restrictions and other communication standards. The GAL gateway 100 can then generate the appropriate files and signals based on the specifications for the particular payment work.

In some embodiments, the GAL gateway 100 can receive business release data, including changes to the specifications for submitting transaction authorization requests, from payment networks in the branded networks layer 260. GAL gateway 100 can then update its own databases and lookup tables to ensure that future communication with the payment networks are not interrupted from the perspective of the merchants. All merchants need to do is to continue formatting transaction authorization requests in the form required by the GAL gateway 100 or any of the one or more APIs that it supports. This functionality of the GAL gateway 100 is advantageous to merchants because it can help alleviate the burden on the merchants from having to update, maintain and manage changes to the communication standards that payment networks periodically make.

FIG. 4 is a block diagram of the contemporary system for providing connectivity between merchants in merchant layer 220 to payment networks in the branded networks layer 260 via some number of acquiring gateways in acquiring gateway layer 250. As discussed above, for many smaller merchants, such as small merchant 223, it may not make economic or business sense to maintain direct connections with the payment networks in the branded networks layer 260. The task is simply too expensive or labor-intensive to be feasible.

However to gain access to any and all of the payment networks, many small merchants use traditional acquirers to handle their transaction authorization requests and to submit them to the intended payment network. An acquirer can be a bank that owns the merchants business account or can be a specialized service provider that charges the merchant, either on a subscription or a per transaction basis, to receive and route transaction authorization requests to the appropriate payment network.

As shown, this system still has significant drawbacks in that there are a number of acquirers in the acquiring gateway layer 250. Some of the acquirers in the acquiring gateway layer 250 can be connected to some of the payment networks in the branded networks layer 260. However, a merchant still may be restricted in the selection of payment networks available based on its selection of acquirer. For example, FIG. 4 shows small merchant 223 accepting a transaction authorization requests initiated by the consumer using a Visa credit card. Small merchant 223 then must send a transaction authorization request to a selected acquirer, in this case Cyber Source. Cyber Source then routes the transaction authorization request to the intended payment network selected from the number of payments networks with which it is affiliated.

Although Cyber Source is connected to Visa™, MasterCard™ Shazam™ and American Express™ in this example, it is not associated with or connected to the NYCE™ or the Pulse™ networks. To submit transaction authorization requests to any of the payment networks with which Cyber Source is not connected or associated, small merchant 223 must then associate itself with or subscribe to the services of another acquirer, such as acquirer 251, acquirer 252, acquirer 253, acquirer 254 or some other acquirer in the acquiring gateway layer 250. In the best case, the merchants might only have to be associated with two acquirers however, to be able accept payments using all the payment networks they would like to use, merchant may need associate with three or more acquirers. Such arrangements do little to reduce the cost and complexity of submitting transaction authorization requests to a larger selection of payment networks.

Each acquirer in the acquiring gateway layer 250 usually has different communication standards for submitting transaction authorization requests. Therefore, small merchant 223 would have to incorporate into its transaction authorization request handling protocols a final system or routine for determining which acquiring gateway it will use to submit the transaction authorization request to a particular payment network. The merchant would then have to generate the appropriate transaction authorization request message and send it according to the communication standards required by the specific acquirer. Such systems offer very little in terms of cost and resource savings to merchants who have to incorporate the services of multiple acquirers. Although the services provided by the acquirers in the acquiring gateway layer 250 address some of the needs of small merchants, they still lock out the small merchant from various advantages and cost savings afforded to larger merchants with greater resources and negotiation power.

FIG. 5 is a block diagram of a system in which a gateway abstraction layer 240 including a GAL gateway 100 can be added to the system shown in FIG. 4 to improve a merchant's access to more payment networks than it might have access to using its current acquirer or payment processor. As shown, the gateway abstraction layer 240 can be inserted in between the merchant layer 220 and the acquiring gateway layer 250. The GAL gateway 100 in the gateway abstraction layer 240 can then communicate directly with both the acquirer associated with the small merchant 223 (here Cyber Source) through which the merchant indirectly accesses some number of payment networks. The GAL gateway 100 can also connect directly with other payment networks previously inaccessible to small merchant 223 through its previous acquirer. Advantages of such embodiments include the ability of GAL gateway 100 to offer a single communication standard to small merchant 223 for submitting transaction authorization requests to its acquirer and the payment networks to which is connected, while also providing access to a greater number of payment networks in the branded networks layer 260. In some embodiments, GAL gateway 100 can maintain and manage updates to the communication standards required for any and all of the acquirers in the acquiring gateway layer 250 as well as a communication standards required by the payment networks in the branded networks layer 260.

Figure 6:
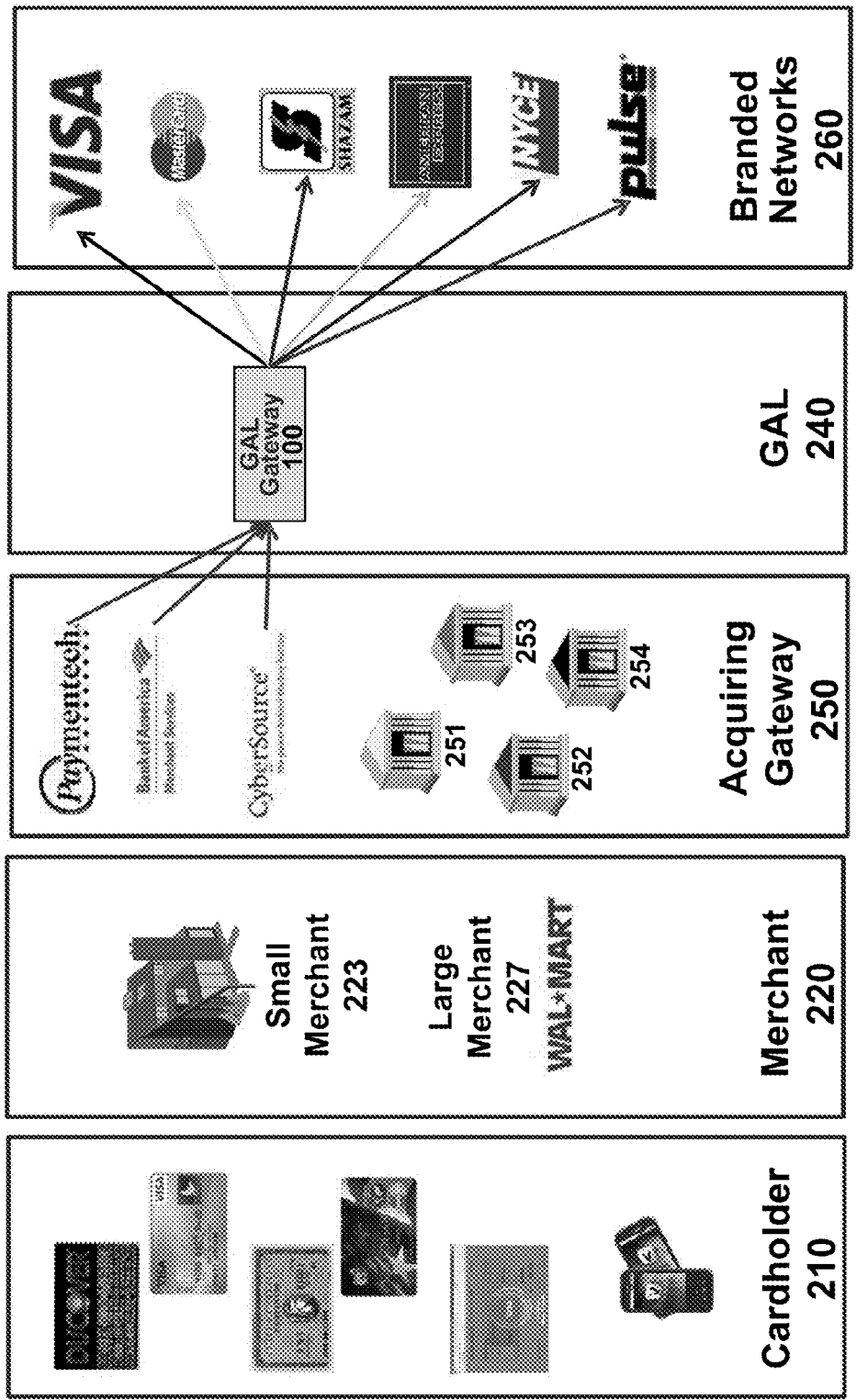
FIG. 6 is a block diagram of a payment processing system including a GAL gateway according to various embodiments of the present invention.

FIG. 6 shows a block diagram of a system for using a gateway abstraction layer 240 having a GAL gateway 100 for assisting and facilitating transaction authorization requests between payment processors and acquirers in the acquiring gateway layer 250 and the payment networks in the branded networks layer 260. As GAL gateway 100 can offer merchants a consistent and uniform standards for file formats, protocols, connectivity models and other communication standards, it can also offer these benefits to acquirers and payment processors in the acquiring gateway layer 250. Each acquirer has only to conform with the communication standards of the GAL gateway 100, thus reducing the cost and overhead associated with maintaining, managing and handling communication standards for multiple payment networks.

Effectively, the system shown in FIG. 6 gives each one of the acquirers and/or payment processors in the acquiring gateway layer 250 access to any and all payment networks in the branded networks layer 260. Any updates to the communication standards required by the payment networks can be managed by the GAL gateway 100 for the acquirers and/or payment processors. Each of the merchants in the merchant layer 220 can then have access to the payment network choice using their chosen acquirer or payment processor.

Figure 7:
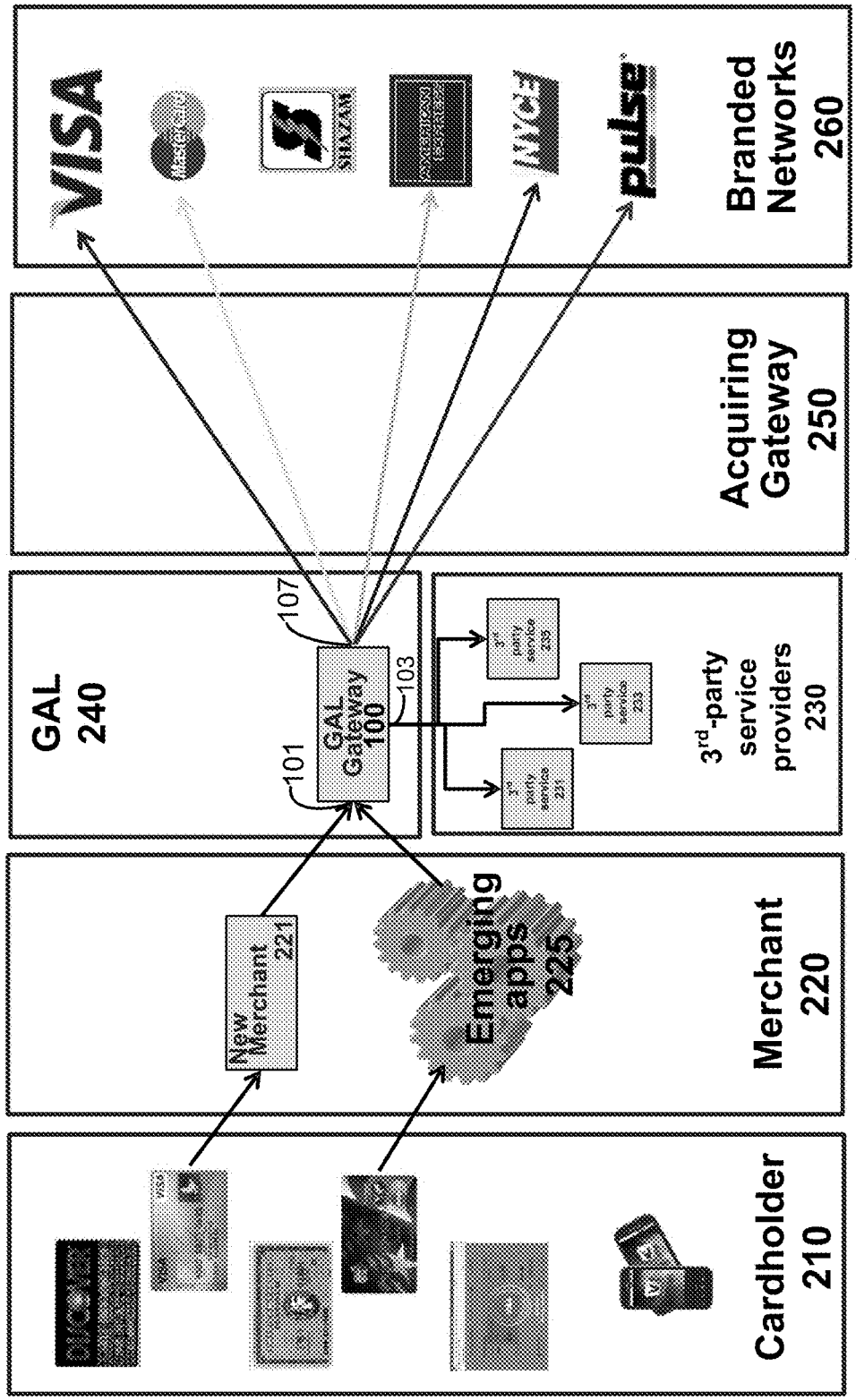
FIG. 7 is a block diagram of the payment processing system including a
GAL gateway and third-party transaction service providers according to various embodiments of the present invention.

FIG. 7 is a block diagram of a system according to one embodiment of the present invention for using a gateway abstraction layer 240 having a GAL gateway 100. FIG. 7 shows the connectivity between new merchants 221 and emerging applications 225 in the merchant layer 220, third-party service providers in a value added third-party layer 230 and payment networks in the branded networks layer 260 that allows the system to bypass the need for acquirers in the acquiring gateway 250. As shown, the GAL gateway 100 can include interfaces 101 for communicating with and connecting to merchants 221 and other emerging applications 225 in the merchant layer 220. The GAL gateway 100 can also connect to a number of third-party service providers 231, 233 in 235 in the value added third-party service providers layer 230 using interfaces 103. Finally, GAL gateway 100 can also include interfaces 107 for translating and communicating authorization and service requests from merchants and third-party service providers according to the communication requirements of the intended payment network.

The interface 101 between merchants 221 and the GAL gateway 100 can include published and/or open communication standards for sending and receiving communications. In some embodiments, interface 101 can be an open standard application platform interface (API) which can be offered to merchants 221 and emerging applications 225 for free or for a fee. Using the communication standards provided by GAL gateway 100, merchants 221 and emerging applications 225 can incorporate a single communication standard onto which they can hang their own business transaction, payment transaction and other financial transaction routines and procedures with inputs or output that communicate with third-party service providers and/or payment networks through the GAL gateway 100. Because the GAL gateway 100 can manage any changes to communication standards published by the third-party service providers or by the payment networks, the GAL gateway 100 can function as a buffer to change for the merchants and emerging applications that might be overwhelmed organizationally or financially if required to adapt to the frequent changes on their own.

Interface 103 between the GAL gateway 100 and third-party service providers 231, 233 in 235 in the third-party service provider layer 230 can also include a published and/or open communication standard for sending and receiving communications. As with interface 101, interface 103 can also be an open standard application platform interface (API) that can be published to third party service providers for free or for a fee. The third-party service providers 231, 233 and 235 can then design and execute various functions and services attached to the GAL gateway 100 API.

In some embodiments, the third-party service providers can provide downloadable code distributed by the embedded application distribution layer 108 of services store layer 105 of the GAL gateway 100. In such embodiments, GAL gateway 100 can manage embedded application distribution functions of software and other applications provided by third party service providers and developers to merchants 221 and other emerging applications 225. Eventually, emerging applications 225, in addition to accepting financial transaction authorization requests from account holders in the cardholder layer 210, there is potential for the emerging applications 225 to migrate, at least partially, into the service provider layer 230 as an additional third-party service provider or third-party service provider aggregator.

By providing a uniform communication standard for the third-party service providers 231, 233 and 235, GAL gateway 100 provides the capability for the third-party service providers to market their services to merchants 221 and emerging applications 225 in parallel or in addition to the services being provided by payment networks in the branded networks layer 260. In this way, third-party service providers in the third-party service provider layer 230 can specifically market their applications, software and software as a service (SaaS) to particular merchants and merchant types. For example a merchant who accepts Visa brand credit card transactions can, in addition to the Visa brand fraud detection services available, also select scoring or offer services from one or more of the third-party service providers to customize the merchant's exposure and its customers' shopping experience. The third-party service providers can also introduce a new revenue stream in the form of advertising, profit sharing, click-through dollars when they partner with one or more merchants.

Interfaces 107 can differ from interfaces 101 and 103 in that interfaces 107 are specifically designed and maintained to supply the requisite communication standards required by each one of payment networks. In other words, interfaces 107 are specifically configured to allow each one of the payment networks in branded networks layer 260 to communicate with the GAL gateway 100 according to its own communication standards.

In some embodiments, GAL gateway 100 can provide the payment networks in the branded networks layer 260 with a uniform and consistent protocol with which to report any changes to the respective communication standards required by each payment network. However, GAL gateway 100 can also be configured to accept, parse and integrate business releases published by payment networks announcing changes to file formatting requirements, network accessibility standards and other communication standards, as well as changes to reporting, billing and reconciliation procedures. In such embodiments, this capability of the GAL gateway 100 eliminates the need for each merchant and emerging applications 225 in merchant layer 220 to maintain their own database and implementation of indicated standards for the payment networks.

The third-party service providers in the third-party service providers layer 230 can include a number of service providers, software developers and SaaS type services. The third-party service providers 231, 233 in 235 can customize or specifically target their products toward the needs of new merchant 221, the emerging applications 225 and any of the merchants in merchant layer 220. By opening the marketplace into the third-party service providers layer 230, GAL gateway 100 allows merchants, large and small, to specifically request various services included with their transaction authorization requests sent to GAL gateway 100.

As previously discussed, the transaction authorization requests can be a payment authorization request which is part of the merchants' payment acceptance protocols and procedures. In various embodiments, entities, such as new merchant 221, emerging applications 225 and the small and large merchants 223 and 227, in the merchant layer 220 can contact GAL gateway 100 over a number of networking protocols. For example merchants in merchant layer 220 can connect to the GAL gateway 100 by open and proprietary wired and wireless networks such as the Internet, WLAN, LAN and any of the cellular data networks that operate on radio or microwave frequency channels.

Figure 8:
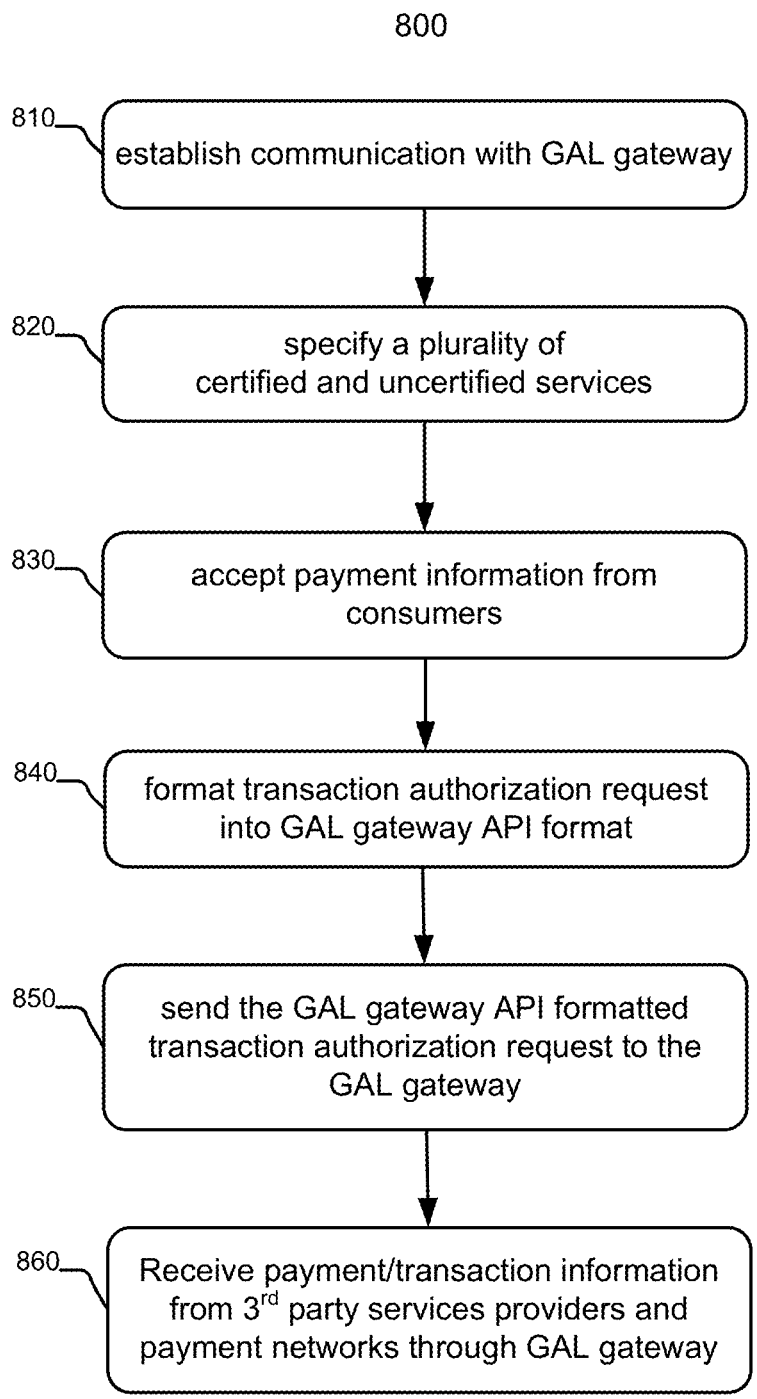
FIG. 8 is a flowchart of a method for conducting transaction service requests and transaction authorization requests with a GAL gateway according to various embodiments of the present invention.

FIG. 8 is a flow chart of a method 800 for using a GAL gateway for conducting a financial transaction according to various embodiments of the present invention. At step 810, a merchant, an application or some other type of user, can establish communication with the GAL gateway. Establishing communication with the GAL gateway can include connecting to a website, connecting to a portal over an encrypted proprietary network, or connecting over any other form of suitable electronic communication. The connection can be either direct or can be facilitated by composite networks such as the Internet.

At step 820, the merchant can specify a plurality of certified and uncertified services offered by third party service providers through the GAL gateway. In some embodiments, a merchant can be charged by GAL gateway 100 for each transaction or transaction service provided by third party service providers. In some embodiments, providing the third-party service can include downloading a downloadable application to the merchant's client computing device, while in other embodiments, the third-party service providers can offer code that can be run by or hosted on the GAL gateway on behalf of each one of the merchants requesting the service. Finally, the GAL gateway can also make service calls to each one of the service providers in the same manner as a SaaS protocol.

The selection and type of third-party services that the merchant selects can be based on a number of factors concerning the merchant. For example merchant may choose to subscribe to a particular fraud detection or dispute resolution service provider so as to make fraud and dispute resolution records received from the third-party service provider consistent across all payment networks. Currently, each payment network can provide somewhat different and inconsistent transaction services which make it difficult for merchant to analyze and report out various data regarding transactions associated with accepting various forms of payment provided by the different payment networks (i.e. payments, charge back, returns, fraud and the like).

Optionally, merchants can determine to take various forms of payment types in real-time and simply update their account with the GAL gateway in real-time. In such embodiments, the GAL gateway or the payment networks can choose to charge the merchant at a new subscription rate or simply charge them a per-transaction fee.

Once a merchant has set up which third-party services and payment networks it would like to use to accept payments, it can begin accepting payment information from consumers at step 830. Information that the merchant collects to initiate a transaction authorization requests can vary based on the requirements of the payment network, the requirements of the GAL gateway and the needs of the services provided by the third-party service providers.

For example, the GAL gateway can require that merchant submit information regarding consumers or cardholders such as consumer's name, address and zip code, as well as SKU codes for the items purchased, the merchant's name and location, credit card identification and security codes. The GAL gateway can require any other customized information fields that the GAL gateway would find useful for reporting information about individual consumers and households of users. Such information can then be used to generate profiles for particular consumers and households of consumers across accounts and across issuers. Such information is currently not available from a single source and can be helpful for profiling and targeting marketing at receptive consumers.

At step 840, in merchant can format the transaction authorization request into the GAL gateway API format or other open source format required by the GAL gateway. In other embodiments, the format of the transaction authorization request can be fully integrated into the merchant's transaction protocols by simply complying with the requirements of the GAL gateway API format requirements. In step 850, the merchant can then send the GAL gateway API formatted transaction authorization request to the GAL gateway. In response to the transaction authorization request, merchants can receive payment/transaction information from the third-party service providers it has selected and the payment networks through the GAL gateway in step 860.

Figure 9:
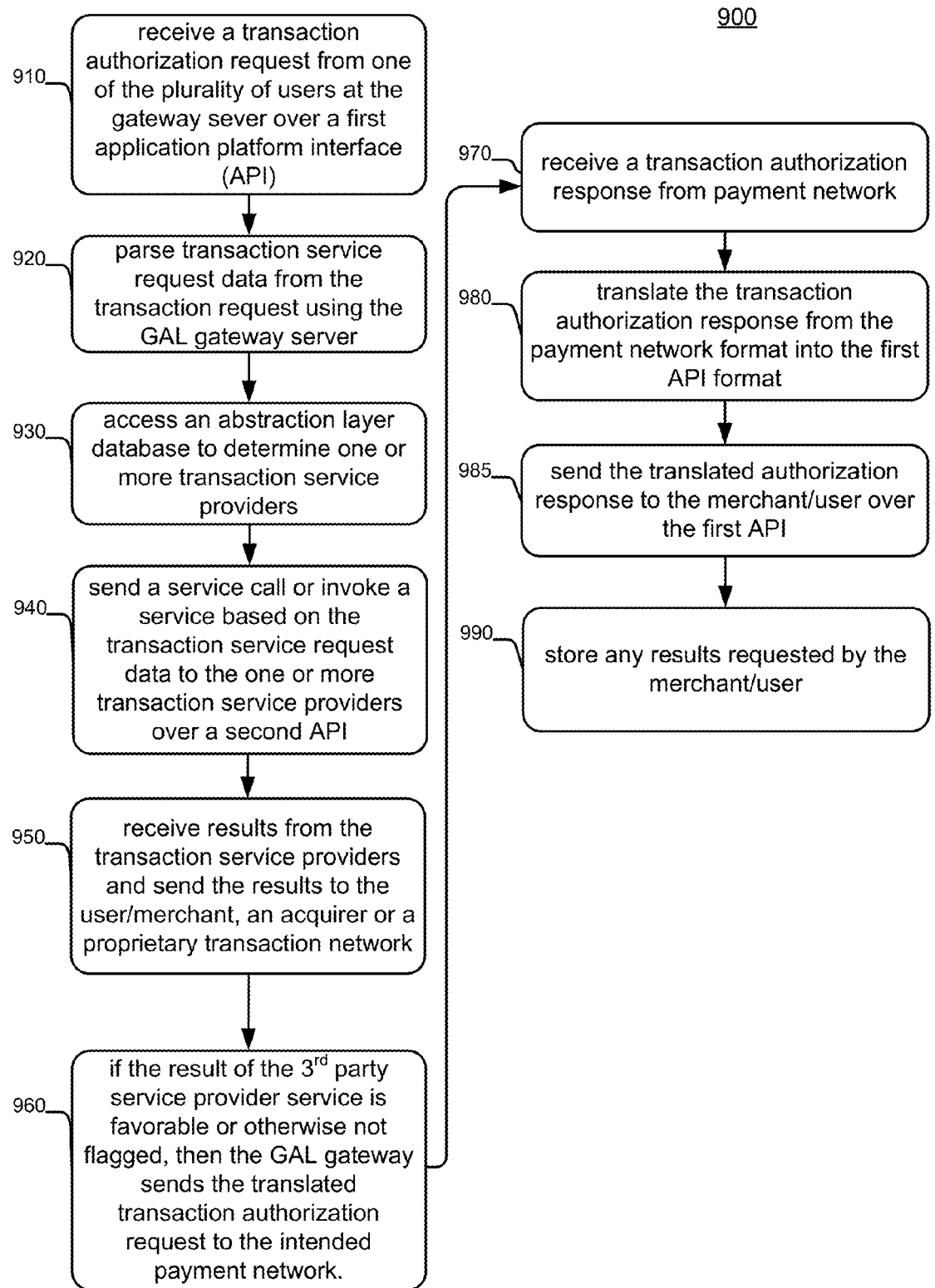
FIG. 9 is a flowchart of a method for processing transaction service requests and transaction authorization requests using a GAL gateway according to various embodiments of the present invention.

FIG. 9 is a flow chart of a method 900 for translating and routing a transaction authorization request to third-party transaction service providers and payment networks using a GAL gateway according to various embodiments of the present invention. The process starts at step 910 in which a GAL gateway receives a transaction authorization request from one of the plurality of merchants/users. The transaction authorization request can be formatted in a standard or open application platform interface (API). In some embodiments, the GAL gateway can be configured as a GAL gateway server having multiple network connections to multiple merchants/users. These connections can be established over proprietary or open networks, such as the VisaNet or the Internet. Accordingly, any electronic communication medium for establishing reliable and secure network connections can be used to establish the connections between the GAL gateway and the merchants/users.

Once the GAL gateway has the transaction authorization request from the merchant in the predefined API format, the GAL gateway can parse the transaction authorization request to extract, or otherwise parse, transaction service request data at step 920. The parsed transaction service request data can include identifiers and/or service calls, i.e. code segments, for establishing connections with the third-party service providers or for running an application provided by third party service provider. The third-party service providers can offer a variety of transaction services including, but not limited to fraud detection, risk management, scoring, offers, partnership, dispute resolution, chargebacks, returns, analytics, and other transaction services regarding the particular transaction authorization request.

In some embodiments, the GAL gateway can include an abstraction layer database with mappings between the various entities to which the GAL gateway server is connected. In step 930, the GAL gateway can access the abstraction layer database to determine one or more transaction service providers based on third-party service provider identifiers parsed from the transaction authorization request. The GAL gateway can then route the appropriate information according to the published API format to the third-party service providers or run the software/applications provided by the third-party service providers using other transaction data parsed from the transaction authorization request, in step 940.

At step 950, in response to sending a service call to one or more of the transaction service providers, or invoking a transaction service application based on the transaction service requests data, the GAL gateway can receive the results from the transaction service providers or the transaction service provider application. The GAL gateway can then translate the results from the third-party service provider from the third-party service provider API format into the API format used to communicate with merchants/users. In some embodiments, the service provider API is identical to the merchant/user API. The translated results can then be sent back to the merchant/user, or, in some embodiments, can also be sent to an acquirer or proprietary transaction network if the merchant/user has specified that such information be shared with other entities.

In step 960, if the results from the third-party service provider services are favorable, or otherwise not flagged for further attention by the merchant/user, then the GAL gateway can send the translated transaction authorization request to the intended payment network. In some embodiments, the intended payment network can be indicated by the information contained in the authorization request message received from the merchant/user and parse out by the GAL gateway. The intended payment network can be indicated by an identifier contained in the transaction authorization request that the GAL gateway can then use to determine the proper translation from the first API format into the payment network data format required by the payment network for accepting transaction authorization requests.

At step 970, the GAL gateway can receive a transaction authorization response from the payment network in the payment networks native transaction authorization response format. The GAL gateway can then translate the transaction authorization response from the payment network format into the first API format used by the merchant/users at step 980. In step 985, the GAL gateway can then send the translated authorization response to the merchant/user using the first API so that the merchant/user can complete or deny the relevant transaction. Finally, in step 990, the GAL gateway can store any results from the third-party service providers or the payment network requested by the merchant/user.

Various benefits and advantages achieved by embodiments of the present invention include benefits and advantages to the various acquirers, payment processors and merchants directly and indirectly connected to the various payment networks. For example, embodiments of the present invention can provide merchants, acquirers, payment processors with the ability to use a single modern format for all payment networks, a reduced impact of the business and operational changes made by the payment networks in business releases, a consistent set of value added transaction services account regardless of issuer, brand or type of payment network, and a single set of connectivity requirements or communication standards for any and all of payment networks. Such embodiments can help reduce the acquiring costs for merchants, payment processors, and acquirers.

Additional benefits and advantages include the ability to provide acquirers, payment processors, and merchants with a selection of tiered connectivity service options. For example, a GAL gateway can offer two level/tiers of services. Tier 1 can be a "Deployment Model." The Deployment Model can include traditional redundant high availability private network deployed out to the endpoint, such as a merchant's physical outlet or web server. Tier 2 can be a "Subscription Model." The Subscription Model can include a slightly less available, but cheaper option, for connectivity in which members securely connect over an open network, such as the Internet.

Additionally, embodiments of the present invention include advantages for third-party service providers. For example, various embodiments provide third-party service providers with a framework in which develop and market software and SaaS for transaction services. The framework can include "plug ins" or sample code to allow developers to rapidly integrate their transaction services and platforms into the Gateway Abstraction Layer and/or the GAL gateway. Furthermore, by having all of merchants payment processing pass through a single gateway, value added services can be applied to all cards brands in a consistent manner, instead of payment network specific application of value added transaction services.

Standard or Canonical Message Models, Formats and Protocols

The gateway abstraction layer/transaction choreographer 1010 can use and include a single standard or canonical system of message models, formats and protocols. As used for clarity herein, the term standard format refers the collection of standard or canonical message models, formats and protocols. For example, the logical model behind the standard format can be designed in UML and turned into XML schema. XML can be used as one wire level format for all messaging, but XML can be replaced or augmented for a subset of messages by other wire level format, such as binary or textual, i.e. CSV, fixed format, etc. Such alternative wire level formats can be used to improve throughput or latency issues.

In some embodiments, software development kits (SDKs) can be written or generated to enable third-party service providers and external brand payment networks to transmit message over the GAL gateway. SDK can be written in various languages, such as Java, Ruby, C/C+/C++, Perl, etc. The wire level formats used in the GAL can therefore be language independent so as to work and communicate with all SDKs. Accordingly, serialized Java objects are not suitable as a wire level format.

The standard or canonical formats can be divided into a number business related process groups. Each business related process group can be associated with a unique identifier which can be used to refer to the process. For example, the business process groups can be "credit card transactions, "accounts," and "billing," which can be associated with abbreviations such as "cctx," "acct," and "bill," respectively. A business related process group can include messages for authentication capture or authorization only.

The standard or canonical format can be stored as XMI, which is the OMG's serialization format for UML, and therefore can be edited using any off-the-shelf UML toolkit, such as MagicDraw™. For example, MagicDraw™ can be used to generate XML schemas by using its report generation wizard that employs customizable velocity templates. The velocity templates can also form part of the build system that can be kept separate from the UML models. In such embodiments, the simple customizations can be used to generate identical schemas from other UML tools using whatever schema generation mechanisms those tools offer.

Furthermore, the structure of the standard or canonical format can be divided into a datadict package containing all shared types and classes and a package specific to each business related process. In come embodiments, it is desirable to allow for backward compatible changes to preexisting business related process types and classes, such as adding an optional field, decreasing the minimum cardinality of the field, increasing the maximum cardinality of a field, and adding an item to an enumeration. On the other hand, backward incompatible changes can be require the creation of a new type or class with an incremented version number suffix. The new type or class should not derive from the original. Such backward incompatible changes include, but are not limited to, adding a mandatory field, increasing the minimum cardinally of a field, decreasing the maximum cardinality of a field, removing an item from an enumeration, and renaming a field. In some embodiments, backward incompatible can be required to not be made to preexisting types.

In other embodiments, the governance of the modification or editing of the standard or canonical format can include various rules and guidelines for creating and updating classes and types of business related processes including, but limited to, only allowing UML classes, only using UML dependency relationship, only using specific types for simple types, requiring all classes and types to be globally defined, allowing no class derivation or inheritance of any sort, requiring all process types and classes to have a unique identifier, such as a four letter acronym.

Since the standard and canonical format, and translations into and out of the format, can include various changes and evolutions, it is often desirable to include a level of management into various embodiment described herein. For example, change management can be built into the standard or canonical format or SDKs that should make rolling out new version fast and efficient. Such implementations can thus also provide for a fast and efficient systems and methods for to integrate and make timely updates based on the practices of third-party services providers or branded payment networks.

Exemplary System Architecture

Figure 10:
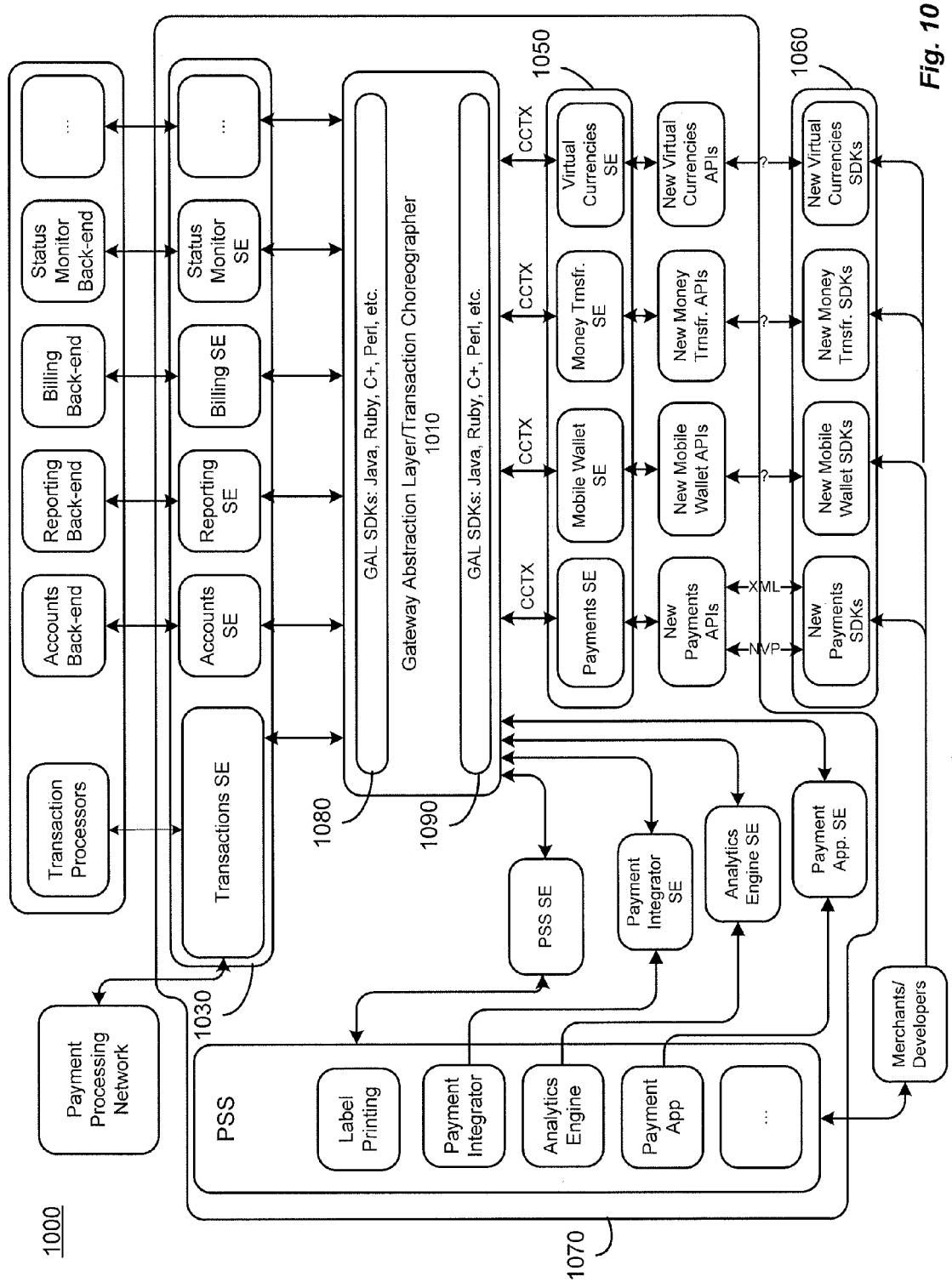
FIG. 10 is a schematic of a system with a GAL gateway according to various embodiments of the present invention.

FIG. 10 is a schematic diagram of a system 1000 according to and capable of implementing various embodiments of the present invention. As shown, gateway abstraction layer/transaction choreographer (GAL/TC) 1010 can be the center of connectivity between a wide range of systems, components and entities. The GAL/TC 1010 can be configured to translate or transform messages, files and communications between a number of different format and/or protocols. For example, the GAL/TC 1010 can be configured to connect to payment processing networks, payment processors, users and merchants using various SDKs 1060 via corresponding new and existing service endpoints ("SEs") 1030 and 1050 developed by third party service providers using one or more standard or canonical message formats.

In various embodiments, all of the components and functionality shown within group 1070 can be performed by components, modules, computers, and logic executed or operating on the server side of the process. Similarly, the functionality of existing back-end implementations and new SDKs used to interface with the GAL/TC 1010 can be run at remote or client side computers at the location of a user or merchant. In other embodiment, such functionality is performed at another server computer associated with the user or merchant. In each of such embodiments, each input and output between the GAL/TC 1010 can be delivered through an interface facilitated by one more GAL SDKs 1080 or 1090. The GAL SDKs can include, but are not limited to SDK's and API constructed in Java, Perl, Ruby, C+, etc.

API Architectures

Figure 11:
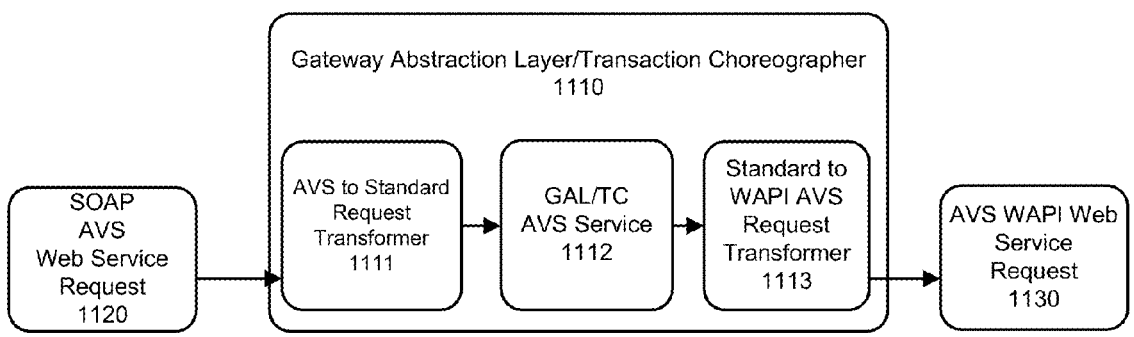
FIG. 11 is a schematic of a system for transforming requests from one application platform interface (API) message format to another API message format according to various embodiments of the present invention.

Embodiments of the present invention rely on various layers of application platform interfaces, or APIs. Each API can be a singular or a collection of service APIs which are themselves a subset of the larger gateway abstraction layer collection of financial and other transactional and informational service APIs. For example, the collection of APIs can include a retail API ("RAPI") that can be implemented by a collection of components included in the gateway abstraction layer/transaction choreographer 1010. The gateway abstraction layer/transaction choreographer 1010 can accept service requests and perform a series of transformations on them before passing them to a wholesale application platform interface ("WAPI"). The transformations may include protocol changes, enrichment, aggregation, validation, authentication and authorization. FIG. 11 is a high level diagram of the RAPI's gateway abstraction layer/transaction choreographer 1110.

FIG. 11 shows gateway abstraction layer/transaction choreographer 1110 can include various functionality, modules, or components to manage storage, messaging and transformation services for the range of commercial services according to various embodiments of the present invention. The RAPI architecture can include services in the gateway abstraction layer/transaction choreographer 1110 that are bound to HTTP endpoint and so the implementation language chose for each service is independent of the language of other services. For example, each service can be implemented in any language, such as Java™ or XML. The services can be loosely or strictly bound by the gateway abstraction layer/transaction choreographer 1110 to other languages. Specifically, the languages capabilities of the gateway abstraction layer/transaction choreographer 1110 can include Vmware vFabric, SpringRoo and Spring Integration. VFabric can include a number of technologies that can provide infrastructure for the for the RAPI can include PaaS provision, Tc Server, Gemfire, Hyperic, RAbbitMQ and ERS.

The gateway abstraction layer/transaction choreographer 1110 shown in FIG. 11 can include functionality, components or subsystems, constructed in any appropriate language, such as account validation request ("AVS") to standard/canonical request transformer 1111, gateway abstraction layer/transaction choreographer ("GAL/TC") AVS service 1112, and standard to WAPI AVS request transformer 1113. Such capability in the gateway abstraction layer/transaction choreographer 1110 allows embodiments to receive messages and requests in on standard format, such as SOAP AVS web request 1120, into an AVS WAPI web service request 1130 that be sent to one or more entities for processing. These messaging and transformation capabilities can produce abstract message types that can include a normalized superset of fields and data in message types and communication protocols provided by other entities. Once the canonical or standard message type is implemented, the gateway abstraction layer/transaction choreographer 1110 services can be developed such that they only require information of the canonical or standard message types, rather than any other entity's, vendor's or third-party service provider's structures or the languages in which they are written, such as XML, SOAP, JSON, and NVP. Adding support for any new formats, simply requires a Java binding API provider to be located, installed and integrated.

Supporting the various external entity, vendor and third-party service provider messages types only requires the production of a module that transforms contents from the entity, vendor and third-party service provider messages type or format in the standard or canonical type or format. Providing the standard or canonical for each service allows the RAPI to be hosted within the gateway abstraction layer/transaction choreographer 1110 infrastructure to leverage the many benefits and services it provides, such as analytics processing and the other value-add services mentions herein. As shown in FIG. 11, across any given gateway abstraction layer/transaction choreographer 1110 service call, incoming message data can be transformed into the appropriate standard or canonical format or representation, and then internally processed until the call reaches the WAPI service, where the standard or canonical message is transformed into the corresponding outbound or WAPI message format.

Each standard or canonical Java model can be produced from an XML schema document ("XSD") which describes various structures and constraints. The XSD document can be produced from a unified modeling language ("UML") XMI description for ease of maintenance. The transformer modules shown in FIG. 11 can be Java based, and produced either manually, populating the standard or canonical from the source message type, or produced automatically from a took such as ADS which can output Java code to perform the field population as configured by a graphical user interface.

Figure 12:
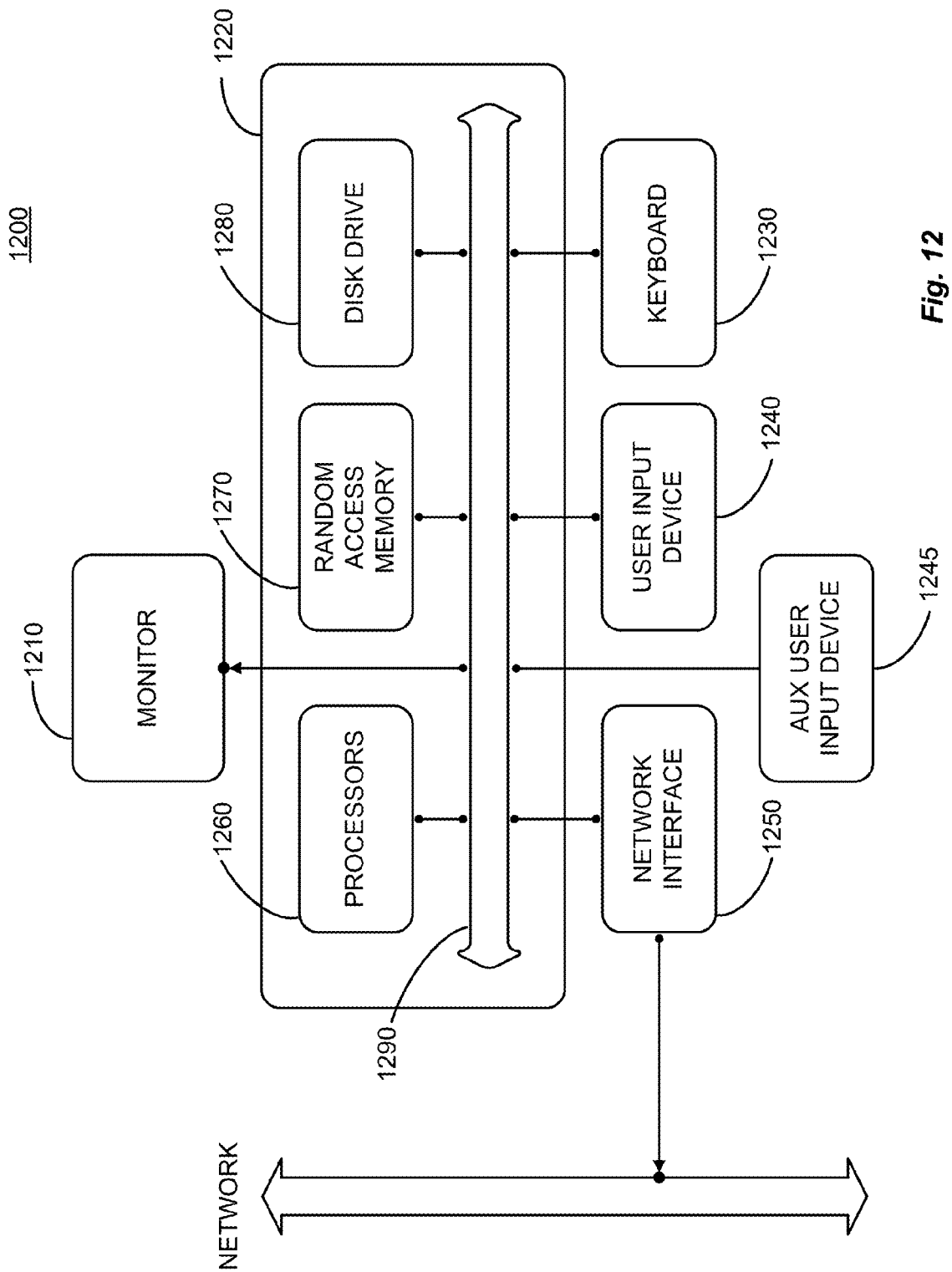
FIG. 12 is a block diagram of typical computer system configured to execute computer readable code to implement various functions and steps according to various embodiments of the present invention.

FIG. 12 is a block diagram of typical computer system 1200 configured to execute computer readable code to implement various functions and steps according to various embodiments of the present invention.

System 1200 is representative of a computer system capable of embodying the present invention. The computer system can be present in any of the elements in FIGS. 1 through 7, including the GAL gateway 100 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™ Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1200 typically includes a display 1210, computer 1220, a keyboard 1230, a user input device 1240, computer interfaces 1250, and the like. In various embodiments, display (monitor) 1210 may be embodied as a CRT display, an LCD display, a plasma display, a direct-projection or rear-projection DLP, a microdisplay, or the like. In various embodiments, display 1210 may be used to display user interfaces and rendered images.

In various embodiments, user input device 1240 is typically embodied as a computer mouse, a trackball, a track pad, a joystick, wireless remote, drawing tablet, voice command system, and the like. User input device 1240 typically allows a user to select objects, icons, text and the like that appear on the display 1210 via a command such as a click of a button or the like. An additional specialized user input device 1245, such a magnetic stripe, RFID transceiver or smart card reader may also be provided in various embodiments. In other embodiments, user input device 1245 include additional computer system displays (e.g. multiple monitors). Further user input device 1245 may be implemented as one or more graphical user interfaces on such a display.

Embodiments of computer interfaces 1250 typically include an Ethernet card, a modem (telephone, satellite, cable, ISDN), (asynchronous) digital subscriber line (DSL) unit, FireWire interface, USB interface, and the like. For example, computer interfaces 1250 may be coupled to a computer network, to a FireWire bus, or the like. In other embodiments, computer interfaces 1250 may be physically integrated on the motherboard of computer 1220, may be a software program, such as soft DSL, or the like.

RAM 1270 and disk drive 1280 are examples of computer-readable tangible media configured to store data such user data, account data, merchant data, third-party service provider data, payment network data, abstraction layer databases and look-up tables and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1220 typically includes familiar computer components such as a processor 1260, and memory storage devices, such as a random access memory (RAM) 1270, disk drives 1280, and system bus 1290 interconnecting the above components.

In some embodiments, computer 1220 includes one or more Xeon microprocessors from Intel. Further, in the present embodiment, computer 1220 typically includes a UNIX -based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method comprising:
establishing, by a merchant or acquirer computer, communication with a gateway server;
transmitting, from the merchant or acquirer computer to the gateway server, a service request message including service request data or transaction authorization request data, wherein the service request message is intended for a service provider or a payment network, wherein the service request message is transmitted according to a first format over a first application platform interface (API) regardless of communication standard requirements of the service provider or the payment network, wherein the gateway server thereafter:
parses the service request data from the service request message, the service request data including a service provider identifier indicating the service provider;
accesses an abstraction layer database to determine the service provider using the service provider identifier;
translates, using the abstraction layer database, at least a portion of the service request data into a second data format to communicate with the service provider, the second data format being different from the first data format, the second data format satisfying the communication standard requirements of the service provider;
transmits a service call message to the service provider over a second API, the service call message including the translated service request data in the second data format;
parses the transaction authorization request data from the service request message, the transaction authorization request data including a payment network identifier indicating a payment network;
translates, using the abstraction layer database, at least a portion of the transaction authorization request data into a third data format to communicate with the payment network, the second data format being different than the third data format, the third data format satisfying communication standard requirements of the payment network;
transmits a transaction authorization request message to the payment network, the transaction authorization request message including the translated transaction authorization request data in the third data format; and
manages changes to the communication standard requirements of the service provider and the payment network such that the second format complies with the communication standard requirements of the service provider and the third format complies with the communication standard requirements of the payment network.

2. The method of claim 1, wherein the gateway server receives a result from the service provider and transmits the result to the merchant computer, the acquirer computer, or the payment network.

3. The method of claim 2, wherein the abstraction layer database comprises a lookup table of communication standards or APIs.

4. The method of claim 3, wherein the lookup table comprises a mapping of translations between the first API and the second API.

5. The method of claim 1, wherein the gateway server receives an update from the service provider and updates the abstraction layer database based on the update.

6. The method of claim 5, wherein the update includes a change to one or more communication standards associated with the service provider.

7. The method of claim 1, wherein the gateway server receives a transaction authorization response message from the payment network and translates the transaction authorization response message into a data format compatible with the first API, and wherein the method further comprises:
receiving, by the merchant or acquirer computer from the gateway server, the translated transaction authorization response message over the first API.

8. The method of claim 1, wherein, before transmitting the transaction authorization request message to the payment network, the gateway server receives a message indicating a positive result of the service call message from the service provider over the second API.

9. The method of claim 1, wherein the gateway server utilizes a canonical message format.

10. The method of claim 9, wherein the canonical message format is XML.

11. The method of claim 9, wherein the canonical message format is augmented for at least one of the service request message or the transaction authorization request message.

12. The method of claim 9, wherein the canonical message format is divided into datadict packages specific to the service provider or the payment network.

13. The method of claim 9, wherein the gateway server is configured to communicate with service endpoints for payment, mobile wallet, money transfer, and virtual currency transactions.

14. A computing device comprising:
a processor; and
a computer readable medium coupled to the processor, wherein the computer readable medium includes code executable by the processor for implementing a method comprising:
establishing communication with a gateway server;
transmitting, to the gateway server, a service request message including service request data or transaction authorization request data, wherein the service request message is intended for a service provider or a payment network, wherein the service request message is transmitted according to a first format over a first application platform interface (API) regardless of communication standard requirements of the service provider or the payment network, wherein the gateway server thereafter:
parses the service request data from the service request message, the service request data including a service provider identifier indicating the service provider;
accesses an abstraction layer database to determine the service provider using the service provider identifier;
translates, using the abstraction layer database, at least a portion of the service request data into a second data format to communicate with the service provider, the second data format being different from the first data format, the second data format satisfying the communication standard requirements of the service provider;
transmits a service call message to the service provider over a second API, the service call message including the translated service request data in the second data format;
parses the transaction authorization request data from the service request message, the transaction authorization request data including a payment network identifier indicating a payment network;

translates, using the abstraction layer database, at least a portion of the transaction authorization request data into a third data format to communicate with the payment network, the second data format being different than the third data format, the third data format satisfying communication standard requirements of the payment network;

transmits a transaction authorization request message to the payment network, the transaction authorization request message including the translated transaction authorization request data in the third data format; and manages changes to the communication standard requirements of the service provider and the payment network such that the second format complies with the communication standard requirements of the service provider and the third format complies with the communication standard requirements of the payment network.

15. The computing device of claim 14, wherein the gateway server receives a result from the service provider and transmits the result to the merchant computer, the acquirer computer, or the payment network.

16. The computing device of claim 15, wherein the abstraction layer database comprises a lookup table of communication standards or APIs.

17. The computing device of claim 16, wherein the lookup table comprises a mapping of translations between the first API and the second API.

18. The computing device of claim 14, wherein the gateway server receives an update from the service provider and updates the abstraction layer database based on the update.

19. The computing device of claim 18, wherein the update includes a change to one or more communication standards associated with the service provider.

20. The computing device of claim 14, wherein the gateway server receives a transaction authorization response message from the payment network and translates the transaction authorization response message into a data format compatible with the first API, and wherein the method further comprises:

receiving, by the computing device from the gateway server, the translated transaction authorization response message over the first API.

21. The computing device of claim 14, wherein, before transmitting the transaction authorization request message to the acquirer computer or payment network, the gateway server receives a message indicating a positive result of the service call message from the service provider over the second API.

22. A computer-implemented method comprising:

receiving, by a service provider computer of a service provider from a gateway server, a service call message, wherein the gateway server is configured to:

establish communication with one of a plurality of merchant or acquirer computers;

receive a service request message including service request data or transaction authorization request data, wherein the service request message is intended for the service provider or a payment network, wherein the service request message is transmitted according to a first format from the one of the plurality of merchant or acquirer computers over a first application platform interface (API) regardless of communication standard requirements of the service provider or the payment network;

parse the service request data from the service request message, the service request data including a service provider identifier indicating the service provider;

access an abstraction layer database to determine the service provider using the service provider identifier;

translate, using the abstraction layer database, at least a portion of the service request data into a second data format to communicate with the service provider computer, the second data format being different from the first data format, the second data format satisfying the communication standard requirements of the service provider;

transmit the service call message to the service provider computer over a second API, the service call message including the translated service request data in the second data format;

parse the transaction authorization request data from the service request message, the transaction authorization request data including a payment network identifier indicating a payment network;

translate, using the abstraction layer database, at least a portion of the transaction authorization request data into a third data format to communicate with the payment network, the second data format being different than the third data format, the third data format satisfying communication standard requirements of the payment network;

transmit a transaction authorization request message to the payment network, the transaction authorization request message including the translated transaction authorization request data in the third data format; and manage changes to the communication standard requirements of the service provider and the payment network such that the second format complies with the communication standard requirements of the service provider and the third format complies with the communication standard requirements of the payment network.

23. The method of claim 22, further comprising:

processing, by the service provider computer, the service call message;

generating, by the service provider computer, a result based on the processing of the service call message; and transmitting, by the service provider computer to the gateway server, the result, wherein the gateway server is further configured to transmit the result to the merchant computer or the payment network.

24. The method of claim 23, wherein the abstraction layer database comprises a lookup table of communication standards or APIs.

25. The method of claim 24, wherein the lookup table comprises a mapping of translations between the first API and the second API.

* * * * *

UNITED STATES PATENT AND TRADEMARK OFFICE
CERTIFICATE OF CORRECTION

PATENT NO. : 9,846,905 B2
APPLICATION NO. : 13/971250
DATED : December 19, 2017
INVENTOR(S) : Edward Katzin and Mark Carlson It is certified that error appears in the above-identified patent and that said Letters Patent is hereby corrected as shown below:

In the Claims

In Column 24, Line 27 remove "13. The method of claim 9," and insert -- 13. The method of claim 1, --

Signed and Sealed this
Eighth Day of May, 2018

Andrei Iancu
*Director of the United States Patent and Trademark Office*